United States Patent
Takahashi et al.

(10) Patent No.: US 10,305,119 B2
(45) Date of Patent: May 28, 2019

(54) TITANIUM MATERIAL OR TITANIUM ALLOY MATERIAL HAVING SURFACE ELECTRICAL CONDUCTIVITY AND METHOD FOR PRODUCING THE SAME, AND FUEL CELL SEPARATOR AND FUEL CELL USING THE SAME

(71) Applicant: NIPPON STEEL & SUMITOMO METAL CORPORATION, Tokyo (JP)

(72) Inventors: Kazuhiro Takahashi, Tokyo (JP); Taku Kagawa, Tokyo (JP); Masanari Kimoto, Tokyo (JP); Junko Imamura, Tokyo (JP); Kiyonori Tokuno, Tokyo (JP); Atsuhiko Kuroda, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/109,342

(22) PCT Filed: Jan. 22, 2015

(86) PCT No.: PCT/JP2015/051668
§ 371 (c)(1),
(2) Date: Jun. 30, 2016

(87) PCT Pub. No.: WO2015/111653
PCT Pub. Date: Jul. 30, 2015

(65) Prior Publication Data
US 2016/0329575 A1 Nov. 10, 2016

(30) Foreign Application Priority Data
Jan. 22, 2014 (JP) .................... 2014-009341

(51) Int. Cl.
*H01M 8/02* (2016.01)
*H01M 8/0228* (2016.01)
(Continued)

(52) U.S. Cl.
CPC ........... *H01M 8/0228* (2013.01); *C22C 14/00* (2013.01); *C22F 1/183* (2013.01); *C23C 8/02* (2013.01);
(Continued)

(58) Field of Classification Search
CPC .... C22C 14/00; C22F 1/00; C22F 1/18; C22F 1/183; C23C 8/02; C23C 8/12;
(Continued)

(56) References Cited

U.S. PATENT DOCUMENTS 7,855,003 B2    12/2010   Arico et al.
2010/0233587 A1*    9/2010   Sato .................... H01M 4/8657
                                                                                  429/523

(Continued)

FOREIGN PATENT DOCUMENTS

CN    101841049 A    9/2010
EP    2337135 A1    6/2011
(Continued)

OTHER PUBLICATIONS

Russian Search Report for corresponding Russian Application No. 2016128712, dated May 4, 2017, with an English translation.
(Continued)

Primary Examiner — Ula C Ruddock
Assistant Examiner — Tony S Chuo
(74) Attorney, Agent, or Firm — Birch, Stewart, Kolasch & Birch, LLP

(57) ABSTRACT

In a titanium material or a titanium alloy material, in an oxide film formed on a surface of a titanium or a titanium alloy, the composition ratio of TiO $(I_{TiO}/(I_{Ti}+I_{TiO}))\times 100$ found from the maximum intensity of the X-ray diffraction peaks of TiO ($I_{TiO}$) and the maximum intensity of the X-ray diffraction peaks of metal titanium ($I_{Ti}$) in X-ray diffraction measured at an incident angle to the surface of 0.3° is 0.5%
(Continued)

or more. A titanium material or a titanium alloy material, and a fuel cell separator and a polymer electrolyte fuel cell having good contact-to-carbon electrical conductivity and good durability can be provided.

6 Claims, 5 Drawing Sheets

(51) Int. Cl.

| | | |
|---|---|---|
| C25D 9/08 | (2006.01) | |
| C22C 14/00 | (2006.01) | |
| H01M 8/0206 | (2016.01) | |
| H01M 8/0215 | (2016.01) | |
| C22F 1/18 | (2006.01) | |
| H01M 8/0208 | (2016.01) | |
| C23C 8/80 | (2006.01) | |
| C23G 1/10 | (2006.01) | |
| C23C 8/02 | (2006.01) | |
| C23C 8/12 | (2006.01) | |
| H01M 8/1018 | (2016.01) | |

(52) U.S. Cl.
CPC .............. *C23C 8/12* (2013.01); *C23C 8/80* (2013.01); *C23G 1/106* (2013.01); *C25D 9/08* (2013.01); *H01M 8/0206* (2013.01); *H01M 8/0208* (2013.01); *H01M 8/0215* (2013.01); *H01M 2008/1095* (2013.01); *Y02P 70/56* (2015.11)

(58) Field of Classification Search
CPC . C23C 8/80; C23G 1/106; C25D 9/08; H01M 2008/1095; H01M 8/0206; H01M 8/0208; H01M 8/0215; H01M 8/0228; Y02P 70/56
See application file for complete search history.

(56) References Cited

U.S. PATENT DOCUMENTS

| | | |
|---|---|---|
| 2011/0177430 A1 | 7/2011 | Takahashi et al. |
| 2012/0171468 A1 | 7/2012 | Tanaka et al. |
| 2015/0147678 A1 | 5/2015 | Kihira et al. |

FOREIGN PATENT DOCUMENTS

| | | | |
|---|---|---|---|
| JP | 2000-328200 A | 11/2000 | |
| JP | 2004-273370 A | 9/2004 | |
| JP | 2005-36314 A | 2/2005 | |
| JP | 2005-38823 A | 2/2005 | |
| JP | 2005-56776 A | 3/2005 | |
| JP | 2005-209399 A | 8/2005 | |
| JP | 2007-5084 A | 1/2006 | |
| JP | 2006-140095 A | 6/2006 | |
| JP | 2006-156288 A | 6/2006 | |
| JP | 2006-190643 A | 7/2006 | |
| JP | 2007-131947 A | 5/2007 | |
| JP | 2007-234244 A | 9/2007 | |
| JP | 2009-181936 A | 8/2009 | |
| JP | 2009-238560 A | 10/2009 | |
| JP | 2009-289511 A | 12/2009 | |
| JP | 2010-97840 A | 4/2010 | |
| JP | 2010-108673 A | 5/2010 | |
| JP | 2010-129458 A | 6/2010 | |
| JP | 2010-236083 A | 10/2010 | |
| JP | 2010-248570 A | 11/2010 | |
| JP | 2010-248572 A | 11/2010 | |
| JP | 2011-77018 A | 4/2011 | |
| JP | 2012-28045 A | 2/2012 | |
| JP | 2012-28046 A | 2/2012 | |
| JP | 2012-28047 A | 2/2012 | |
| JP | 2012-43775 A | 3/2012 | |
| JP | 2012-43776 A | 3/2012 | |
| JP | 4926730 B2 | 5/2012 | |
| JP | 2013-109891 A | 6/2013 | |
| RU | 2323506 C2 | 4/2008 | |
| RU | 2461100 C1 | 9/2012 | |
| WO | 2006/055146 A2 | 5/2006 | |
| WO | WO 2010/038544 A1 | 4/2010 | |
| WO | WO 2011/016465 A1 | 2/2011 | |
| WO | WO 2014/021298 A1 | 2/2014 | |
| WO | WO 2015/111652 A1 | 7/2015 | |

OTHER PUBLICATIONS

Canadian Office Action, dated Jul. 7, 2017, for corresponding Canadian Application No. 2,935,529.
Gemelli et al., "Oxidation Kinetics of Commercially Pure Titanium," Revista Matéria, vol. 12, No. 3, 2007, pp. 525-531.
Lu et al., "Oxidation of a Polycrystalline Titanium Surface by Oxygen and Water," Surface Science, vol. 458, Issues 1-3, Jun. 20, 2000, pp. 80-90.
Eraković et al., "Antifungal activity of Ag:hydroxyapatite thin films synthesized by pulsed laser deposition on Ti and Ti modified by $TiO_2$ nanotubes substrates," Applied Surface Science, Elsevier, vol. 293, 2014 (available online Dec. 21, 2013), pp. 37-45, XP028829227.
Extended European Search Report, dated Apr. 13, 2017, for corresponding European Application No. 15740463.3.
Wang et al., "Apatite deposition on thermally and anodically oxidized titanium surfaces in a simulated body fluid," Biomateriais, Elsevier, vol. 24, No. 25, Nov. 2003, pp. 4631-4637, XP004452456.
International Search Report for PCT/JP2015/051668 dated Apr. 14, 2015.
Lütjering et al., "Ti-2003 Science and Technology", Wiley-VCH Verlag GmbH & Co., Hamburg, 2004, vol. V, pp. 3111-3124, total 11 pages.
Written Opinion of the International Searching Authority for PCT/JP2015/051668 (PCT/ISA/237) dated Apr. 14, 2015.
Canadian Office Action, dated Mar. 26, 2018, for corresponding Canadian patent application No. 2,935,529.
European Office Action for corresponding European Application No. 15740463.3 dated Jul. 9, 2018.
A Chinese Office Action and Search Report, dated Jan. 30, 2018, for corresponding Chinese Application No. 201580004830.4.

\* cited by examiner

FIG. 4
(a)
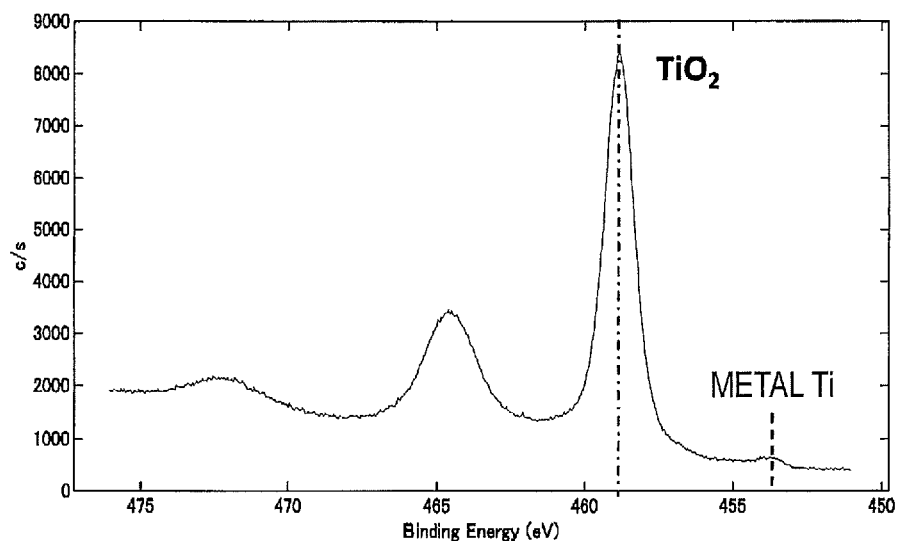
(b)
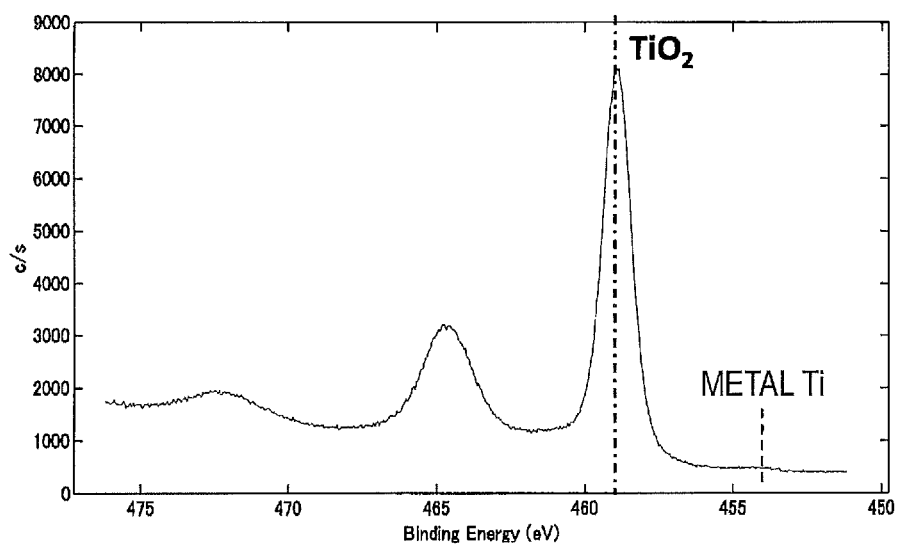

TITANIUM MATERIAL OR TITANIUM ALLOY MATERIAL HAVING SURFACE ELECTRICAL CONDUCTIVITY AND METHOD FOR PRODUCING THE SAME, AND FUEL CELL SEPARATOR AND FUEL CELL USING THE SAME

TECHNICAL FIELD

The present invention is an invention relating to a titanium material or a titanium alloy material of which a surface has electrical conductivity and excellent corrosion resistance, and is suitable particularly for a titanium material or a titanium alloy material used for a low-contact-resistance polymer electrolyte fuel cell separator used for automobiles using electric power as the drive source, electricity generating systems, etc., that is, a titanium material or a titanium alloy material for a fuel cell separator having excellent contact-to-carbon electrical conductivity and excellent durability and a method for producing the same, and a fuel cell separator and a fuel cell using the same. Hereinbelow, a description is given using a fuel cell separator as an example.

BACKGROUND ART

These days, the development of polymer electrolyte fuel cells, as fuel cells for automobiles, is beginning to progress rapidly. The polymer electrolyte fuel cell is a fuel cell in which hydrogen and oxygen are used and an organic substance film of a hydrogen-ion-selective permeability type (also the development of compositing with an inorganic substance is in progress) is used as the electrolyte. As the hydrogen of fuel, hydrogen gas obtained by the reforming of alcohols etc. is used as well as pure hydrogen.

However, in the existing fuel cell systems, the unit prices of components and members are high, and large decreases in the costs of the components and members are essential for the application to consumer products. In the application to automobile uses, not only cost reduction but also the compactification of a stack that forms the heart of the fuel cell is desired.

The polymer electrolyte fuel cell has a structure in which separators push both sides of a unit called a membrane electrode assembly (hereinafter occasionally referred to as an "MEA") in which a polymer electrolyte film, an electrode, and a gas diffusion layer are integrated, and this structure is stacked in multiple layers to form a stack.

The properties required for the separator are to have electron conductivity, isolation properties between the oxygen gas and the hydrogen gas of both electrodes, low contact resistance with the MEA, good durability in the environment in the fuel cell, etc. Here, of the MEA, the gas diffusion layer (GDL) is generally made of carbon paper in which carbon fibers are integrated, and hence it is desired for the separator to have good contact-to-carbon electrical conductivity.

Stainless steel, titanium material, etc. as the material for the separator generally have low contact-to-carbon electrical conductivity in the state as they are, and hence many proposals has been made in order to enhance the contact-to-carbon electrical conductivity. The presence of a passive film with low electrical conductivity is an obstacle to enhance the contact-to-carbon electrical conductivity. Although this problem can be solved by sacrificing the durability, the interior of the fuel cell becomes a severe corrosion environment, and hence very high durability is required for the separator.

Thus, it is a reality that the development of a satisfying metal material for the separator is extremely difficult. Thus far, a carbon separator has been the mainstream, but when a metal separator is put to practical use, the fuel cell itself can be compactified and it can be ensured that cracking does not occur during the fuel cell production process; thus, the metallization of the separator is essential for mass production and spread.

In such a background, for example, Patent Literature 1 discloses a technology in which a special stainless steel in which a compound having electrical conductivity is precipitated in steel material is used from the viewpoints of thinness, weight reduction, etc. and thus the contact resistance of the stainless steel is allowed to be effectively reduced.

Also the use of titanium, which has good durability, for the separator is being investigated. Also in the case of titanium, the contact resistance with the MEA is high due to the presence of a passive film on the outermost surface of the titanium, like in stainless steel. Thus, for example, Patent Literature 2 discloses a technology in which a TiB-based precipitate is dispersed in titanium to reduce the contact resistance with the MEA.

Patent Literature 3 discloses a titanium alloy for a separator made of a titanium alloy in which Ta is contained at 0.5 to 15 mass % and the amounts of Fe and O are restricted as necessary, and in which the average nitrogen concentration of the area extending 0.5 μm in depth from the outermost surface is 6 atomic % or more and tantalum nitride and titanium nitride are present in the area.

Patent Literature 3 also discloses a method for producing a titanium alloy for a separator, in which heating is performed in the temperature range of 600 to 1000° C. for 3 seconds or more in a nitrogen atmosphere.

Patent Literatures 4, 5, and 6 disclose technologies in which an electrically conductive substance is pushed into an outer layer portion by the blasting method or the roll processing method in the production process of a metal separator made of titanium or stainless steel. In this technology, both to-carbon electrical conductivity and durability are achieved by a surface fine structure in which the electrically conductive substance is placed so as to penetrate through a passive film of the metal surface.

Patent Literature 7 discloses a method for producing a fuel cell separator in which an impurity containing titanium carbide or titanium nitride formed on a titanium surface is converted to an oxide by anodic oxidation treatment and then plating treatment is performed. The titanium carbide or the titanium nitride formed on the titanium surface is dissolved during the exposure to a corrosion environment and is re-precipitated as an oxide that inhibits the contact electrical conductivity, and reduces the contact electrical conductivity.

The method mentioned above suppresses the oxidation of the impurity during electricity generation (during use), and thus enhances the durability. However, an expensive plating film is indispensable in order to ensure electrical conductivity and durability.

Patent Literature 8 discloses a technology in which a titanium-based alloy obtained by alloying a group 3 element of the periodic table is used as the base material, BN powder is applied to the surface of the base material, and heating treatment is performed to form an oxide film to form a corrosion-resistant electrically conductive film.

This technology enhances the electrical conductivity by doping an impurity atom into the position of a titanium atom in the crystal lattice of the oxide film, which forms a passive film of the titanium alloy.

Patent Literatures 9 and 10 disclose technologies in which, when a fuel cell separator made of titanium is subjected to rolling processing, a carbon-containing rolling oil is used to perform rolling to form an altered layer containing titanium carbide on the outer layer and form thereon a carbon film with high film density, and electrical conductivity and durability are thus ensured.

In these technologies, although the electrical conductivity to carbon paper is enhanced, the durability is maintained by the carbon film and hence it is necessary to form a dense carbon film. Since contact resistance is high at a simple interface between carbon and titanium, titanium carbide, which enhances the electrical conductivity, is placed therebetween. However, if there is a defect in the carbon film, the corrosion of the altered layer (containing titanium carbide) and the base material cannot be prevented, and a corrosion product that inhibits the contact electrical conductivity may be produced.

Patent Literatures 11, 12, 13, 14, and 15 disclose titanium and fuel cell separators made of titanium that include, as the main structure, a carbon layer/a titanium carbide intermediate layer/a titanium base material, whose structures are similar to the structure described in Patent Literature 9. Although the production procedure of forming a carbon layer beforehand and then forming a titanium carbide intermediate layer is different from the production procedure described in Patent Literature 9, the mechanism of enhancing the durability by means of a carbon layer is similar.

Patent Literature 16 discloses a technology in which, for the purpose of mass production, graphite powder is applied and rolling is performed, and annealing is performed. This technology has achieved the function of the conventional carbon separator by providing a carbon layer and a titanium carbide intermediate layer on the base material titanium surface free from cracking.

However, the titanium carbide intermediate layer does not have durability; hence, if there is a defect in the carbon layer, the corrosion of the titanium carbide intermediate layer and the base material cannot be prevented, and it is concerned that a surface structure could allow the production of a corrosion product that inhibits the contact electrical conductivity.

In this actual situation, Patent Literature 17 discloses a technology in which titanium carbide or titanium nitride as an electrically conductive substance is placed on a titanium surface, and these electrically conductive substances as well as the titanium are covered with a titanium oxide having passivation action. Although this technology ensures a contact electrical conductivity and also improves the durability, in order to further prolong the fuel cell lifetime, it is necessary to further enhance the environmental deterioration resistance of the titanium oxide film that covers the electrically conductive substance.

Thus, the present applicant has proposed, in Patent Literature 18, a titanium or a titanium alloy material for a fuel cell separator in which, while durability enhancement by subjecting a titanium oxide film to a passivation treatment in which immersion is performed in an aqueous solution containing an oxidizing agent such as nitric acid or chromic acid is taken as a basis, titanium compound particles containing carbon or nitrogen, which are minute electrically conductive objects, are dispersed in the oxide film of the surface of the titanium or the titanium alloy material, and thus the contact-to-carbon electrical conductivity is enhanced.

The present applicant has proposed, in Patent Literature 19, using a carbide, a nitride, a carbonitride, or a boride of tantalum, titanium, vanadium, zirconium, or chromium as minute electrically conductive objects and performing stabilization treatment after passivation treatment in aqueous solutions.

The stabilization treatment uses an aqueous solution containing rice flour, wheat flour, potato starch, corn flour, soybean flour, a pickling corrosion inhibitor, or the like, which is a naturally derived substance or an artificially synthesized substance containing one or more of an amine-based compound, an aminocarboxylic acid-based compound, a phospholipid, a starch, calcium ions, and polyethylene glycol.

The internal environment of the polymer electrolyte fuel cell and the conditions of simulation evaluations thereof will now be described.

Patent Literatures 20, 21, 22, 23 and 24 discloses that a minute amount of fluorine is dissolved out and a hydrogen fluoride environment is produced when a fluorine-based polymer electrolyte is used for the electrolyte film. It is presumed that there is no dissolving-out of fluorine from the electrolyte film when a hydrocarbon polymer is used.

Patent Literature 24 discloses that the pH of a discharged liquid is made approximately 3 experimentally. In Patent Literature 10, a potentiostatic corrosion test in which an electric potential of 1 V is applied in a sulfuric acid aqueous solution at pH 4 and 50° C. is employed, and in Patent Literatures 11, 12, 13 and 14, a durability evaluation test in which an electric potential of 0.6 V is applied in a sulfuric acid aqueous solution at approximately pH 2 and 80° C. is employed.

Patent Literature 25 discloses an operating temperature being 80 to 100° C. In Patent Literatures 21 and 24, 80° C. is used as an evaluation condition. From the above, it is easily supposed that the evaluation conditions for simulating a polymer electrolyte fuel cell are (1) an aqueous solution at pH 2 to 4 in which fluorine is dissolved due to the polymer electrolyte of the electrolyte film, (2) a temperature of 50 to 100° C., and (3) a cell voltage change of 0 to 1 V (the voltage being 0 before electricity generation).

On the other hand, from the viewpoint of the environment resistance of titanium, it is known that titanium is dissolved in a hydrogen fluoride aqueous solution (hydrofluoric acid). Non-Patent Literature 1 discloses that the color change of titanium is promoted when fluorine is added at approximately 2 ppm or approximately 20 ppm to a sulfuric acid aqueous solution at pH 3.

Patent Literature 26 discloses a method in which a titanium alloy containing one or more elements of the platinum group-based elements (Pd, Pt, Ir, Ru, Rh, and Os), Au, and Ag is immersed in a non-oxidizing acid to form on the surface a layer containing them in a total amount of 40 to 100 atomic %. Patent Literature 27 discloses a titanium material for a separator in which a titanium alloy containing 0.005 to 0.15 mass % of one or more platinum group elements and 0.002 to 0.10 mass % of one or more rare-earth elements is pickled with a non-oxidizing acid to concentrate the one or more platinum group elements on the surface.

The color change phenomenon described in Patent Literature 25 is a phenomenon in which interference colors occur as a result of the fact that titanium is dissolved and re-precipitated as an oxide on the surface and an oxide film has grown. Since the re-precipitated oxide is a substance that inhibits the contact electrical conductivity as described above, the environment in which fluorine is dissolved out in the fuel cell is a more severe environment to titanium; thus, it is necessary to further enhance the durability in order not to increase the contact resistance.

CITATION LIST

Patent Literature

Patent Literature 1: JP 2000-328200A
Patent Literature 2: JP 2004-273370A
Patent Literature 3: JP 2007-131947A
Patent Literature 4: JP 2007-005084A
Patent Literature 5: JP 2006-140095A
Patent Literature 6: JP 2007-234244A
Patent Literature 7: JP 2010-097840A
Patent Literature 8: JP 2010-129458A
Patent Literature 9: JP 2010-248570A
Patent Literature 10: JP 2010-248572A
Patent Literature 11: JP 2012-028045A
Patent Literature 12: JP 2012-028046A
Patent Literature 13: JP 2012-043775A
Patent Literature 14: JP 2012-043776A
Patent Literature 15: JP 2012-028047A
Patent Literature 16: JP 2011-077018A
Patent Literature 17: WO 2010/038544
Patent Literature 18: WO 2011/016465
Patent Literature 19: Patent Application No. 2013-557959
Patent Literature 20: JP 2005-209399A
Patent Literature 21: JP 2005-056776A
Patent Literature 22: JP 2005-038823A
Patent Literature 23: JP 2010-108673A
Patent Literature 24: JP 2009-238560A
Patent Literature 25: JP 2006-156288A
Patent Literature 26: JP 2006-190643A
Patent Literature 27: JP 2013-109891A Non-Patent Literature Non-Patent Literature 1: G. Lutjering and J. Albrecht: Ti-2003 Science and Technology, Wiley-VCH Verlag GmbH & Co., Hamburg, 2004, pp. 3117-3124.

SUMMARY OF INVENTION

Technical Problem

The problem to be solved by the present invention is to enhance the contact-to-carbon electrical conductivity (low contact resistance) and the durability in a titanium material or a titanium alloy material with high contact-to-carbon electrical conductivity and further prolong the lifetime of the fuel cell. The durability is specifically (1) the corrosion resistance to F ions (fluoride ions) and (2) the durability to the applied voltage, in an acidic environment.

Solution to Problem

Conventionally, as the technology of reducing the contact resistance between titanium and titanium alloy and carbon, a technology in which the surface of titanium and titanium alloy is coated with a carbon (electrically conductive substance) layer, a technology in which a carbide, a nitride, a carbonitride, and/or a boride of titanium, tantalum, or the like is finely dispersed in an oxide film of the surface, or a technology in which a platinum group element, Au, or Ag is concentrated on the surface has been the mainstream.

However, the present inventors made extensive research on the method to solve the problem mentioned above regardless of the conventional technologies. Consequently, it has been revealed that the surface structure of the titanium material or the titanium alloy material greatly influences the contact-to-carbon electrical conductivity and the durability.

As a result of further extensive research by the present inventors, the present inventors have been found that, fundamentally unlike the conventional technologies that utilize a carbon layer (electrically conductive substance), the carbide, nitride, carbonitride, and/or boride mentioned above, or a platinum group element, Au, or Ag, the problem mentioned above can be solved by distributing a prescribed TiO on the outer layer and forming a titanium oxide film on the outermost surface. A specific production method is obtained by using an intermediate material in which a titanium hydride in a prescribed form is formed on the surface of a titanium and a titanium alloy and subjecting the intermediate material to heating treatment in an oxidizing atmosphere. The present inventors have also found that the effect of the present invention is exhibited regardless of whether a platinum group-based element, Au, or Ag is contained in the surface or not.

The present invention has been made on the basis of the above findings, and its summary is as follows.

[1]

A titanium material or a titanium alloy material, wherein in an oxide film formed on a surface of a titanium or a titanium alloy, the composition ratio of TiO ($I_{TiO}/(I_{Ti}+I_{TiO})$)× 100 found from the maximum intensity of the X-ray diffraction peaks of TiO ($I_{TiO}$ and the maximum intensity of the X-ray diffraction peaks of metal titanium ($I_{Ti}$) in X-ray diffraction measured at an incident angle to the surface of 0.3° is 0.5% or more.

[2]

The titanium material or the titanium alloy material according to [1], wherein a diffraction peak of TiO is detected in X-ray diffraction measured at the surface at an incident angle of 0.3° and the maximum intensity of the X-ray diffraction peaks of a titanium hydride is at a background level.

[3]

The titanium material or the titanium alloy material according to [1] or [2], wherein each of the amounts of increase in contact resistance from before to after deterioration test 1 and deterioration test 2 below is 10 mΩcm² or less, deterioration test 1: immersion for 4 days in a sulfuric acid aqueous solution at 80° C. adjusted to pH 3 and having a fluoride ion concentration of 20 ppm, deterioration test 2: application of an electric potential of 1.0 V (vs. SHE) for 24 hours in a sulfuric acid solution at 80° C. and pH 3.

[4]

The titanium material or the titanium alloy material according to any one of [1] to [3], wherein a thickness of the oxide film is 3 to 15 nm.

[5]

A method for producing a titanium material or a titanium alloy material, wherein a titanium intermediate material or a titanium alloy intermediate material in which the composition ratio of a titanium hydride ($I_{Ti-H}/(I_{Ti}+I_{Ti-H})$) at a surface found from the maximum intensity of metal titanium ($I_{Ti}$) and the maximum intensity of the titanium hydride ($I_{Ti-H}$) in the X-ray diffraction peaks measured at an incident angle to the surface of 0.3° is 55% or more is subjected to heating treatment at a temperature of not less than 260° C. and less than 350° C. in an oxidizing atmosphere to form an oxide film.

[6]

A fuel cell separator including the titanium material or the titanium alloy material according to any one of [1] to [4].

[7]

A polymer electrolyte fuel cell including the fuel cell separator according to [6].

Advantageous Effects of Invention

According to the present invention, it becomes possible to provide a titanium material or a titanium alloy material having excellent contact-to-carbon electrical conductivity and excellent durability and a fuel cell separator having excellent contact-to-carbon electrical conductivity and excellent durability. When the fuel cell separator is employed, the lifetime of the fuel cell can be greatly prolonged.

BRIEF DESCRIPTION OF DRAWINGS

FIG. 4 is a diagram showing the results of X-ray photoelectron spectroscopy (XPS) (photoelectron spectra of Ti 2p) of the surfaces of two titanium materials or titanium alloy materials of the present invention. (a) shows the result of XPS of the surface of one titanium material or titanium alloy material, and (b) shows the result of XPS of the surface of the other titanium or titanium alloy material.

DESCRIPTION OF EMBODIMENTS

Figure 1:
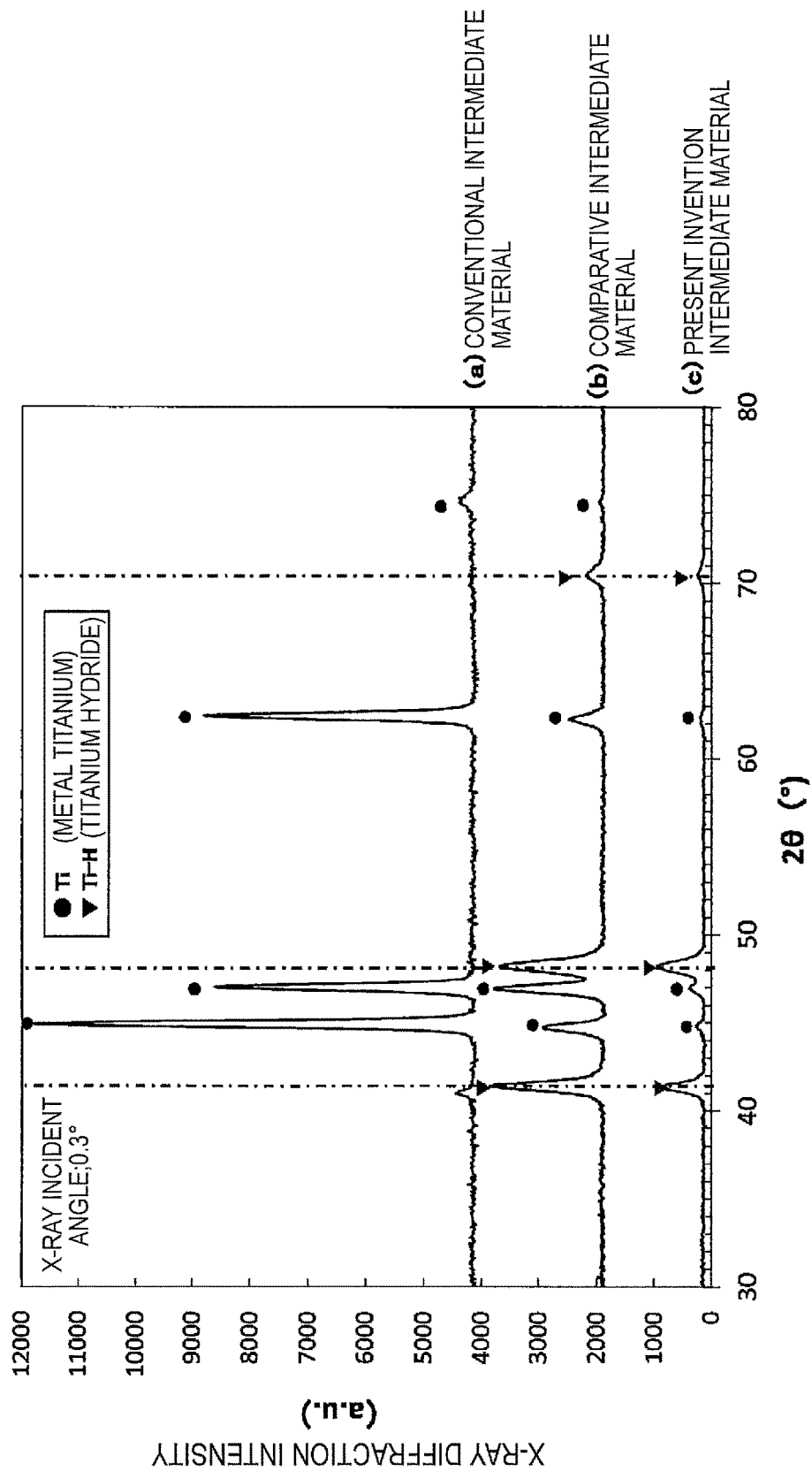
FIG. 1 is a diagram showing X-ray diffraction profiles (XRDs) of the surface of an intermediate material (a titanium intermediate material or a titanium alloy intermediate material). (a) is an XRD of the surface of a conventional intermediate material (a surface after common pickling with nitrohydrofluoric acid), (b) is an XRD of the surface of a comparative intermediate material that has been subjected to hydrogenation treatment, and (c) is an XRD of the surface of an intermediate material of the present invention that has been subjected to hydrogenation treatment.

A titanium material or a titanium alloy material of the present invention has a feature in an oxide film formed on the surface of a titanium or a titanium alloy; in the oxide film, the composition ratio of TiO $(I_{TiO}/(I_{Ti}+I_{TiO}))$ found from the maximum intensity of the X-ray diffraction peaks of TiO $(I_{TiO})$ and the maximum intensity of the X-ray diffraction peaks of metal titanium $(I_{Ti})$ is 0.5% or more. By using such a composition ratio, the oxide film is made a film having stable electrical conductivity.

As an example of the specific method for producing the titanium material or the titanium alloy material of the present invention, a titanium or a titanium alloy material having a surface structure in which the composition ratio of a titanium hydride $(I_{Ti-H}/(I_{Ti}+I_{T-H}))$ of the surface satisfies Formula (1) below is used as a titanium intermediate material or a titanium alloy intermediate material before the oxide film is formed (hereinafter, occasionally referred to as simply an "intermediate material").

$$[I_{Ti-H}/(I_{Ti}+I_{Ti-H})]\times 100 \geq 55\% \qquad (1)$$

$I_{Ti-H}$: the maximum intensity of the X-ray diffraction peaks of the titanium hydride (TiH, TiH$_{1.5}$, TiH$_2$, or the like)

$I_{Ti}$: the maximum intensity of the X-ray diffraction peaks of metal Ti $I_{Ti-H}/(I_{Ti}+I_{Ti-H})$ is an index that indicates the composition ratio between metal titanium and the titanium hydride at the surface of the titanium intermediate material or the titanium alloy intermediate material, and a larger value of the index means a phase configuration containing a larger amount of the titanium hydride. Hence, it is limited to 55% or more in (1) above. It is preferably 60% or more. By producing the titanium material or the titanium alloy material of the present invention using the titanium intermediate material or the titanium alloy intermediate material in which the composition ratio of the hydride $[I_{Ti-H}/(I_{Ti}+I_{Ti-H})]\times 100$ at the surface is 60% or more, each of the amounts of increase in the contact resistance from before to after deterioration test 1 and deterioration test 2 described later is 4 mΩcm$^2$ or less.

Here, the X-ray diffraction is a method using oblique incidence in which the incident angle of X-ray is fixed to a low angle, for example to 0.3°, with respect to the surface of the titanium intermediate material or the titanium alloy intermediate material, and is a measurement method that identifies the structure immediately below the surface.

The method for forming a titanium hydride on the outer layer of the titanium intermediate material or the titanium alloy intermediate material (hereinafter occasionally referred to as "hydride formation treatment") is not particularly limited; for example, (x) a method in which the titanium or the titanium alloy material is immersed in hydrochloric acid or sulfuric acid, which is a non-oxidizing acid, (y) a method in which the titanium or the titanium alloy material is cathodically electrolyzed, and (z) a method in which the titanium or the titanium alloy material is subjected to heat treatment in a hydrogen-containing atmosphere are given. A prescribed titanium hydride can be formed on the outer layer of the titanium or the titanium alloy by any of these methods.

Next, in the titanium material or the titanium alloy material of the present invention (hereinafter occasionally referred to as "the present invention material"), it is preferable that a diffraction peak of TiO is detected in the X-ray diffraction measured at an incident angle of 0.3° of the resulting surface, and the diffraction of the titanium hydride is at a background level when the intermediate material containing a prescribed titanium hydride in its outer layer is subjected to heating treatment in an oxidizing atmosphere.

By subjecting the intermediate material mentioned above to heating treatment in an oxidizing atmosphere, the titanium hydride is oxidized to form TiO (an oxide film), and the composition ratio of TiO ($I_{TiO}/(I_{Ti}+I_{TiO})$) at the surface satisfies Formula (2) below.

$$[I_{TiO}/(I_{Ti}+I_{TiO})] \times 100 \geq 0.5\% \quad (2)$$

$I_{Ti-H}$: the maximum intensity of the X-ray diffraction peaks of TiO $I_{Ti}$: the maximum intensity of the X-ray diffraction peaks of metal Ti $[I_{TiO}/(I_{Ti}+I_{TiO})]$ is an index that indicates the composition ratio between metal titanium and TiO at the surface of the titanium material or the titanium alloy material, and indicates that a larger value of the index means a phase configuration containing a larger amount of TiO. Hence, it is limited to 0.5% or more in Formula (2) above. It is preferably 2% or more.

Here, the X-ray diffraction is performed by oblique incidence in which the incident angle of X-ray is fixed to a low angle, for example to 0.3°, with respect to the surface of the titanium material or the titanium alloy material. By the oblique incidence, the structure immediately below the surface can be identified.

When, in the X-ray photoelectron spectroscopy of the surface of the titanium material or the titanium alloy material, a peak is detected in a Ti 2p spectrum at the position of the binding energy of $TiO_2$, which is a titanium oxide, i.e. approximately 459.2 eV, the formation of the titanium oxide film of the outermost surface can be confirmed. The thickness of the titanium oxide film is preferably 3 to 15 nm, and the thickness of the titanium oxide film can be measured by, for example, observing a cross section immediately below the surface with a transmission electron microscope.

As an example of the method for producing the present invention material (hereinafter occasionally referred to as "the present invention material production method"), (i) the intermediate material containing a titanium hydride in its surface is subjected to (ii) heating treatment in an oxidizing atmosphere.

The temperature of (ii) the heating treatment in an oxidizing atmosphere is preferably not less than 260° C. and less than 350° C. The air is most convenient as the oxidizing atmosphere.

The intermediate material or the present invention material is produced such that, in the titanium oxide film of the outermost surface and immediately below it, the amount of carbides, nitrides, carbonitrides, and/or borides of titanium is reduced within the extent of practical usability as a separator, in view of costs as well.

When at least one of C, N, and B is present as an unavoidably mixed-in element in the titanium base material, a carbide, a nitride, a carbonitride, and/or a boride of titanium may be formed during the heat treatment process. To suppress the formation of carbides, nitrides, carbonitrides, and borides of titanium to the extent possible, the total amount of C, N, and B contained in the titanium base material is preferably set to 0.1 mass % or less. It is more preferably 0.05 mass % or less.

In the present invention material, it is preferable that, in the titanium oxide film, the amount of titanium compounds containing at least one of C, N, and B be reduced within the extent of practical usability, in view of costs as well. The effect of the present invention is exhibited when C is at 10 atomic % or less, N at 1 atomic % or less, and B at 1 atomic % or less as a result of an analysis of the surface using X-ray photoelectron spectroscopy (XPS) after the surface is subjected to sputtering of 5 nm with argon.

Here, the depth of argon sputtering is the value converted from the sputtering rate when the sputtering is performed on $SiO_2$. Since a peak is detected in a Ti 2p spectrum also from the surface after sputtering of about 5 nm at the position of the binding energy of $TiO_2$, which is a titanium oxide, i.e. approximately 459.2 eV, the result is an analysis result of the interior of the titanium oxide film.

For the data analysis, MutiPak V. 8.0, an analysis software application produced by Ulvac-phi, Incorporated, was used.

It has been known that the contact resistance of the surface is a relatively small value in a state where oil components of cold rolling remain or in a state where a carbide, a nitride, and/or a carbonitride of titanium, which is an electrically conductive substance, is dispersed on the surface due to heating in a nitrogen gas atmosphere. However, in the state as it is, during the exposure to an acidic corrosion environment of the actual use, these titanium compounds are dissolved and re-precipitated as an oxide that inhibits the contact electrical conductivity, and reduce the contact electrical conductivity.

A fuel cell separator of the present invention (hereinafter occasionally referred to as "the present invention separator") is formed of the present invention material.

A polymer electrolyte fuel cell of the present invention (hereinafter occasionally referred to as "the present invention battery") includes the present invention separator.

The present invention will now be described in more detail with reference to the drawings.

The intermediate material can be obtained by forming a titanium hydride near the surface of a titanium base material by hydride formation treatment.

FIG. 1 shows X-ray diffraction profiles (XRDs) of the surface of a titanium intermediate material or a titanium alloy intermediate material. FIG. 1(a) shows an XRD of the surface of a conventional intermediate material (a surface after common pickling with nitrohydrofluoric acid) is shown; FIG. 1(b) shows an XRD of the surface of a comparative intermediate material that has been subjected to hydrogenation treatment; and FIG. 1(c) shows an XRD of the surface of an intermediate material of the present invention that has been subjected to hydrogen treatment.

For the X-ray diffraction peaks, in the conventional intermediate material of (a), only diffraction peaks of metal titanium (the circle marks in the drawing) are detected; on the other hand, in the comparative intermediate material of (b) and the present invention intermediate material of (c) that have been subjected to hydrogenation treatment, strong diffraction peaks of a titanium hydride (the inverted triangle marks in the drawing) are detected.

When the maximum intensities of the diffraction peaks are compared, it is found that the ratio of the titanium hydride to metal titanium is larger in the present invention intermediate material of (c) than in the comparative intermediate material of (b).

In the comparative intermediate material of (b), the value of $[I_{Ti-H}/(I_{Ti}+I_{Ti-H})] \times 100$ is 51%; on the other hand, in the present invention intermediate material of (c), the value is 79% and satisfies Formula (1) above. The intermediate material satisfying Formula (1) above may be referred to as "the present invention intermediate material."

The titanium hydrides of the comparative intermediate material of (b) and the present invention intermediate material of (c) are found to be $TiH_{1.5}$ from the positions of the diffraction peaks. The element concentration distribution in the depth direction from the surface was measured by glow discharge optical emission spectrometry, and it has been found that hydrogen is concentrated in an outer layer portion.

Here, the method of the X-ray diffraction measurement and the method for identifying the diffraction peaks are described.

The X-ray diffraction profile was measured by oblique incidence in which the incident angle of X-ray was fixed to 0.3° with respect to the surface of the titanium or the titanium alloy material, and the diffraction peaks thereof were identified.

Using SmartLab, an X-ray diffraction apparatus manufactured by Rigaku Corporation, Co-Kα (wavelength: λ=1.7902 Å) was used for the target at an incident angle of 0.3°, and a W/Si multiple-layer film mirror (on the incident side) was used for the Kβ removal method. The X-ray source load power (tube voltage/tube current) is 9.0 kW (45 kV/200 mA).

The analysis software application used is X'pert HighScore Plus produced by Spectris Co., Ltd. The measured X-ray diffraction profile may be compared to a database in which a titanium hydride such as ICDD Card No. 01-078-2216, 98-002-1097, 01-072-6452, or 98-006-9970 is used as the reference material; thereby, the diffraction peaks can be identified.

The depth of X-ray entry in the measurement conditions mentioned above is approximately 0.2 μm for metal titanium and approximately 0.3 μm for the titanium hydride, and therefore the X-ray diffraction peaks are X-ray diffraction peaks that reflect the structure extending approximately 0.2 to 0.3 μm in depth from the surface.

Also in the conventional material, when the titanium oxide film is subjected to a prescribed passivation treatment and stabilization treatment, the durability to a simple acidic environment is enhanced, but there is a case where the durability cannot be maintained in a corrosion environment in which fluorine is contained or in a usage environment in which an electric potential is applied.

In the conventional material, when the concentration of fluoride ions in the environment is 20 ppm or more, the contact resistance with carbon paper is increased to approximately 100 mΩ·cm² or more and further to approximately 1000 mΩ·cm², and the amount of increase in the contact resistance is 90 mΩ·cm² or more. In the present invention material, the contact resistance is as low as 10 to 20 mΩ·cm² or less even when the concentration of fluoride ions is 20 to 30 ppm, and the amount of increase in the contact resistance can be suppressed to 10 mΩcmm² or less at most, in a preferred case to 4 mΩcm² or less, and high resistance to fluorine is exhibited.

Thus, in the present invention material, in deterioration test 1 in which immersion is performed for 4 days in a sulfuric acid aqueous solution at 80° C. adjusted to pH 3 and having a fluoride ion concentration of 20 ppm, the amount of increase in the contact resistance with carbon paper after the deterioration test is 10 mΩcm² or less at a surface pressure of 10 kgf/cm². It is preferably 4 mΩ cm² or less. For reference, in the present invention material, the value of the contact resistance after deterioration test 1 is 20 mΩ·cm² or less, preferably 10 mΩ·cm² or less. On the other hand, in the conventional material, the value of the contact resistance is approximately 100 mΩ·cm² or more, and the amount of increase in the contact resistance is approximately 90 mΩ·cm² or more, which values are very large.

In deterioration test 2 in which an electric potential of 1.0 V (vs. SHE) is applied for 24 hours in a sulfuric acid aqueous solution at 80° C. and pH 3, the amount of increase in the contact resistance with carbon paper after the deterioration test is 10 mΩcm² or less at a surface pressure of 10 kgf/cm². It is preferably 4 mΩcm² or less. For reference, in the present invention material, the value of the contact resistance after deterioration test 2 is as low as 20 mΩ·cm² or less, preferably as low as 10 mΩ·cm² or less, and high tolerance can be maintained even when an electric potential is applied. On the other hand, in the conventional material, the value of the contact resistance is as high as approximately 30 mΩ·cm², and the amount of increase in the contact resistance is as high as approximately 20 mΩ·cm².

Each of deterioration tests 1 and 2 can measure the tolerance (the degree of stability) to fluorine and the applied voltage by means of the amount of increase in the contact resistance. As the test time whereby a significant difference can be identified sufficiently, 4 days and 24 hours are selected, respectively. In general, there is seen a tendency for the contact resistance to increase almost linearly with the test time, and when the value has become approximately 30 mΩ·cm² or more, increase rapidly thereafter. The (vs. SHE) represents the value with respect to the standard hydrogen electrode (SHE).

In view of the fact that the contact resistance varies depending on the carbon paper used, the contact resistance measured using TGP-H-120 produced by Toray Industries, Inc. was taken as the standard in the accelerated deterioration test of the present invention.

The present inventors have thought up the idea that the contact resistance of the present invention material being stable at a lower level than existing contact resistances is caused by the titanium hydride formed on the outer layer of the intermediate material before performing heating treatment in an oxidizing atmosphere. With focus on the diffraction peaks from the titanium hydride at the surface of the intermediate material shown in FIG. 1, the present inventors made extensive studies on the correlation between the diffraction intensity of metal titanium (Ti) and the diffraction intensity from the titanium hydride (Ti—H).

Figure 2:
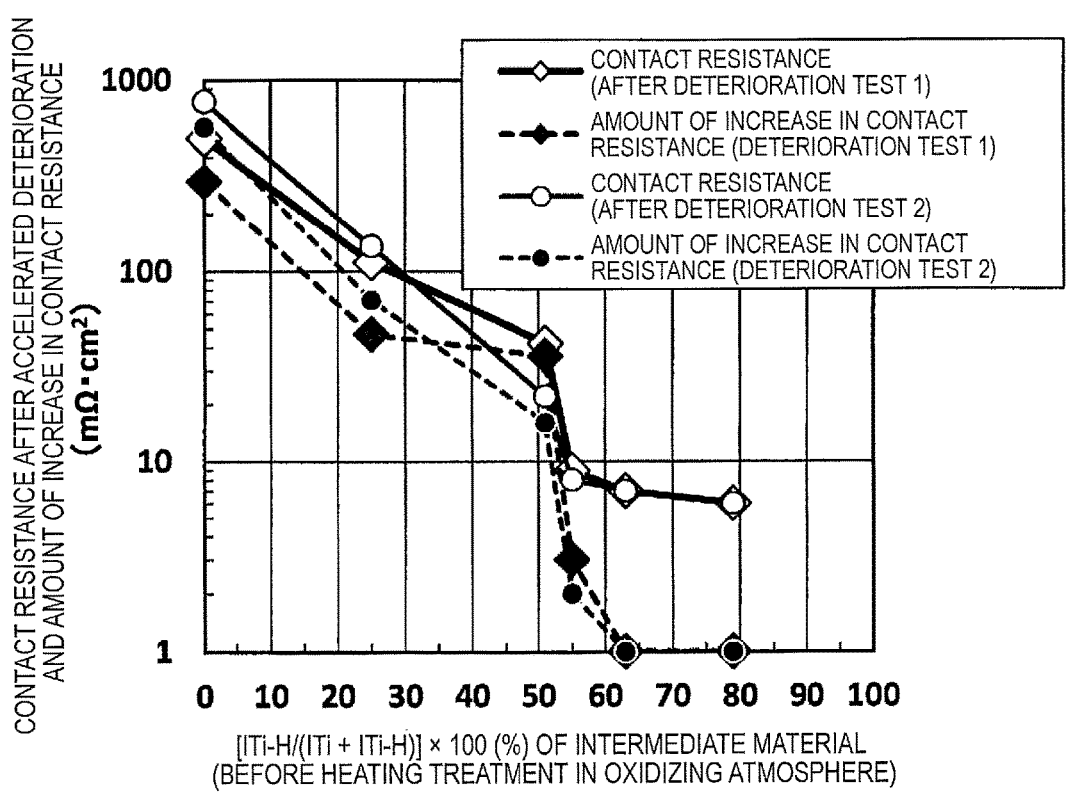
FIG. 2 is a diagram showing the relationships between the value of $[I_{Ti-H}/I_{Ti}+I_{Ti-H})]\times 100$ (Formula (1)) found from the result of X-ray diffraction measured at the surface of a titanium intermediate material or a titanium alloy intermediate material, the contact resistance with carbon paper after a deterioration test after the intermediate material is subjected to heating treatment in the air (an oxidizing atmosphere), and the amount of increase in the contact resistance from before to after the deterioration test. Both deterioration tests 1 and 2 described above are shown in the figure.

The results are shown in FIG. 2. The $[I_{Ti-H}/(I_{Ti}+I_{T-H})] \times 100$ of the intermediate material on the horizontal axis was found from the result of identification of the diffraction peaks in the X-ray diffraction profile measured by oblique incidence in which the incident angle of X-ray was fixed to 0.3° with respect to the surface of the titanium material or the titanium alloy material.

The horizontal axis represents an index of the composition ratio between metal titanium and the titanium hydride at the surface of the titanium intermediate material or the titanium alloy intermediate material (before the heating treatment in an oxidizing atmosphere), and quantitatively indicates that a larger value of the index corresponds to a phase configuration containing a larger amount of the titanium hydride. The vertical axis represents the contact resistance measured by performing a deterioration test after the intermediate material is subjected to heating treatment in the air, which is an oxidizing atmosphere, and the amount of increase in the contact resistance.

The material that had been subjected to heating treatment was subjected to deterioration test 1 described above (immersion for 4 days in a sulfuric acid aqueous solution at 80° C. adjusted to pH 3 and having a fluoride ion concentration of 20 ppm) and deterioration test 2 described above (application of an electric potential of 1.0 V (vs. SHE) for 24 hours in a sulfuric acid solution at 80° C. and pH 3). As can be seen from FIG. 2, the contact resistance after each of deterioration tests 1 and 2 and the amount of increase in the contact resistance are very low when the $[I_{Ti-H}/(I_{Ti}+I_{Ti-H})] \times 100$ of the intermediate material is 55% or more; and it is found that, in the intermediate material, the correlation of Formula (1) exists between the X-ray diffraction intensity of metal titanium (Ti) and the X-ray diffraction intensity from the titanium hydride (Ti—H).

Thus, in the intermediate material, $[I_{Ti-H}/(I_{Ti}+I_{Ti-H})]\times 100$ is set to 55% or more, preferably set to 60% or more, where the contact resistance after the deterioration test and the amount of increase in the contact resistance are stable at a low level as shown in FIG. 2. The upper limit thereof is 100% or less as a matter of course. Although embrittlement due to the titanium hydride is a concern, the contact resistance of the objective of the present invention material has been obtained also when bending-back processing was performed and then heating treatment was performed on an intermediate material with an $[I_{Ti-H}/(I_{Ti}+I_{Ti-H})]\times 100$ of 85% which had been subjected to hydride formation treatment with hydrochloric acid.

Figure 3:
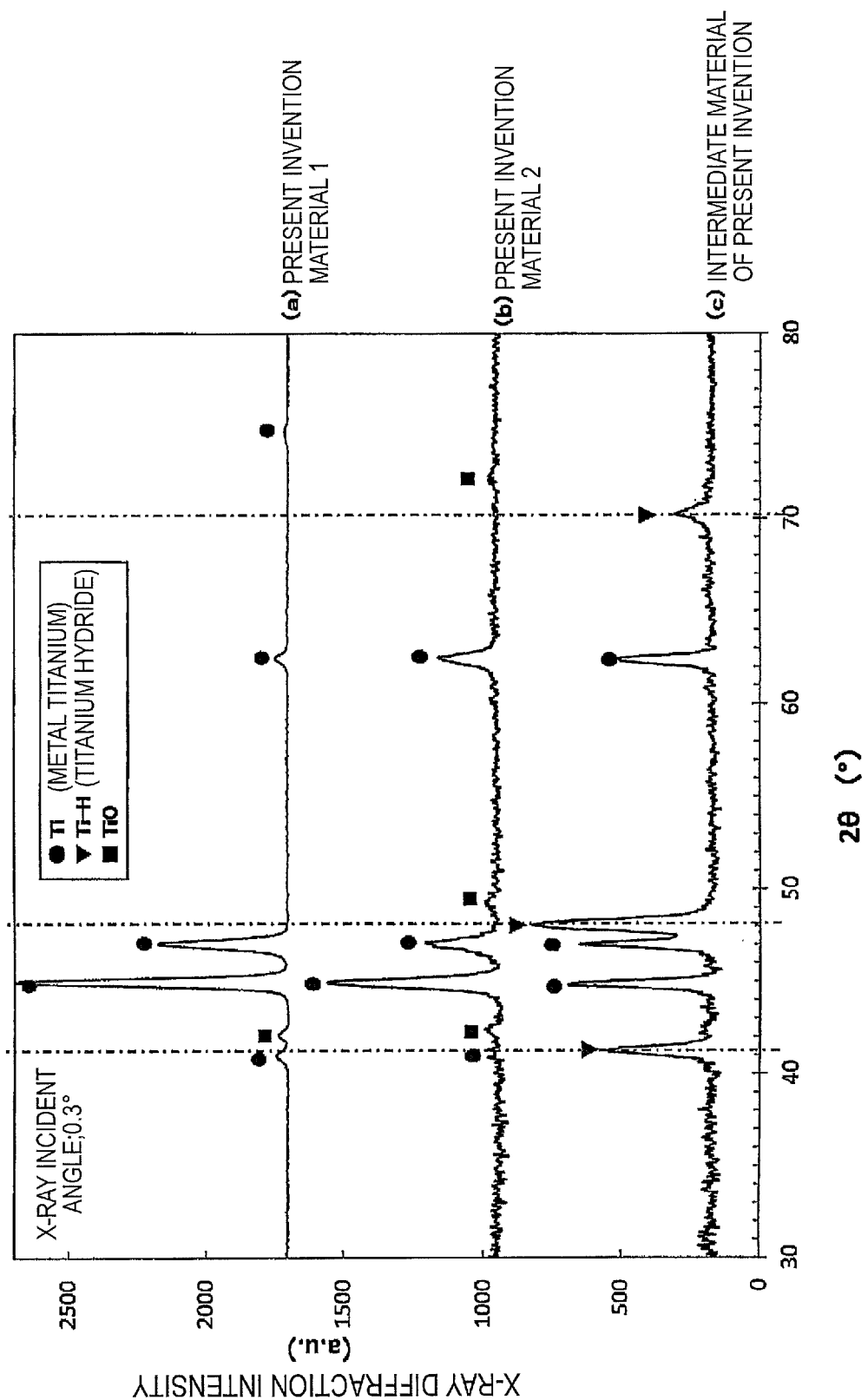
FIG. 3 is a diagram showing X-ray diffraction profiles (XRDs) of the surface of a titanium material or a titanium alloy material. (a) and (b) are XRDs of the surface of the present invention material that has been subjected to heating treatment in the air, which is an oxidizing atmosphere, after hydrogenation treatment, and (c) is an XRD of the surface of the present invention intermediate material in a state where hydrogenation treatment before heating treatment has been performed.

Here, FIG. 3 shows X-ray diffraction profiles (XRDs) of the surface of a titanium material or a titanium alloy material for a fuel cell separator (the present invention material). FIGS. 3(a) and 3(b) show XRDs of the surface of the present invention material that has been subjected to heating treatment in the air, which is an oxidizing atmosphere, after hydrogenation treatment; and FIG. 3(c) shows an XRD of the surface of the present invention intermediate material in a state where hydrogenation treatment before heating treatment has been performed.

When the present invention intermediate material is subjected to heating treatment in an oxidizing atmosphere, in the present invention material as shown in FIG. 3, the diffraction peaks of the titanium hydride present in the present invention intermediate material of (c) (the inverted triangle marks in the drawing) disappear, and in exchange diffraction peaks of TiO (the square marks in the drawing) appear.

When the present invention intermediate material with an $[I_{Ti-H}/(I_{Ti}+I_{Ti-H})]\times 100$ of 55% or more is subjected to heating treatment in an oxidizing atmosphere to produce TiO, the composition ratio of TiO $[I_{TiO}/(I_{Ti}+I_{TiO})]\times 100$ is 0.5% or more. When $[I_{TiO}/(I_{Ti}+I_{TiO})]\times 100$ is 2% or more, a lower contact resistance is obtained, and consequently also the amount of the increase is suppressed to a lower level.

On the other hand, in the case of an intermediate material with an $[I_{Ti-H}/(I_{Ti}+I_{Ti-H})]\times 100$ of less than 55%, the $[I_{TiO}/(I_{Ti}+I_{TiO})]\times 100$ after heating treatment is less than 0.5%; and as shown in FIG. 2, the contact resistance after the deterioration test is more than 20 mΩ·cm², and also the amount of the increase in the contact resistance is more than 10 mΩ·cm².

In a similar manner to the X-ray diffraction of the titanium hydride described above, the X-ray diffraction profile was measured by oblique incidence in which the incident angle of X-ray was fixed to 0.3° with respect to the surface of the titanium or the titanium alloy material, and the diffraction peaks were identified. The measured X-ray diffraction profile may be compared to a database in which TiO of ICDD Card No. 01-072-4593 or 01-086-2352 is used as the reference material; thereby, the diffraction peaks can be identified.

The depth of X-ray entry in the measurement conditions mentioned above is approximately 0.2 µm for metal titanium and approximately 0.2 to 0.3 µm for the titanium oxide, and therefore the X-ray diffraction peaks are X-ray diffraction peaks that reflect the structure extending approximately 0.2 to 0.3 µm in depth from the surface.

Figure 5:
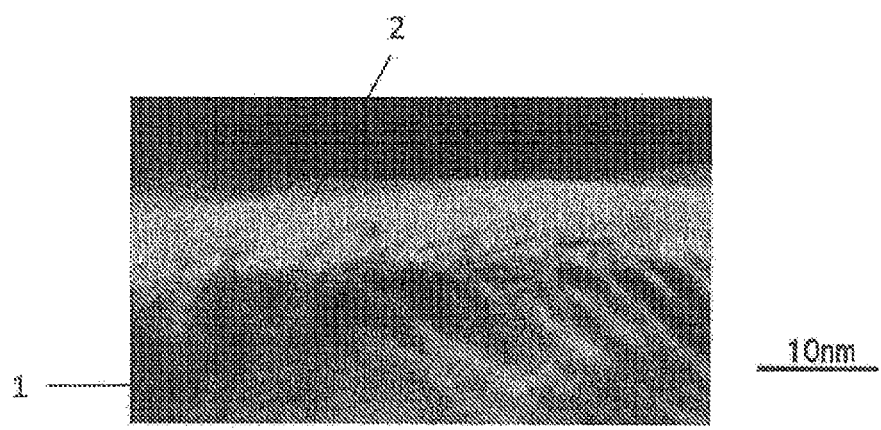
FIG. 5 is a diagram showing a transmission electron microscope image of a cross section immediately below the surface of a titanium material or a titanium alloy material of the present invention.

FIG. 4 is a diagram showing the results of X-ray photoelectron spectroscopy (XPS) (photoelectron spectra of Ti 2p) of the surfaces of two titanium materials or titanium alloy materials for a fuel cell separator of the present invention. FIG. 4(a) shows the result of XPS of the surface of one titanium material or titanium alloy material for a fuel cell separator; and FIG. 4(b) shows the result of XPS of the surface of the other titanium material or titanium alloy material for a fuel cell separator. FIG. 5 shows a transmission electron microscope image of a cross section immediately below the surface of the present invention material.

Although as shown in FIG. 3 no diffraction peak from $TiO_2$ (anatase or rutile) is seen in the X-ray diffraction profile of the present invention material, as shown in FIG. 4 a very strong peak is detected from the outermost surface at the position of the binding energy of $TiO_2$, which is a titanium oxide, i.e. approximately 459.2 eV; thus, it is found that a titanium oxide film mainly made of $TiO_2$ is formed on the outermost surface.

As shown in FIG. 5, a portion 2 in a bright (whitish) film form in the upper portion of Ti 1 is a titanium oxide film. Ti and O are detected from the portion 2 by energy dispersive spectrometry (EDS), and hence a titanium oxide film is formed in the portion 2.

Thus, when the intermediate material in which a titanium hydride satisfying Formula (1) above is formed on the outer layer is subjected to heating treatment in an oxidizing atmosphere, in the present invention material, a surface structure in which TiO satisfying Formula (2) above is distributed on the surface and the outermost surface is formed of a titanium oxide film is created, and large electrical conductivity and high resistance to fluorine are obtained. On the other hand, in the case where the atmosphere of the heating treatment is a vacuum atmosphere, an inert gas atmosphere, or a reducing atmosphere, which is not an oxidizing atmosphere, even when a platinum group element, Au, or Ag is added, a surface structure in which TiO is distributed and the outermost surface is formed of a titanium oxide film as in the present invention is not obtained, and the effect thereof is not exhibited either.

It is presumed that, in the present invention material, a structure in which TiO with a higher electrical conductivity than $TiO_2$ coexists in the titanium oxide film of the outermost surface is formed, and thereby a significant effect is exhibited.

The titanium hydride formed on the outer layer of the intermediate material whereby the present invention material is obtained plays an important role. The action of the titanium hydride is presumed to be due to the mechanism described below.

Although the titanium hydride present on the outer layer of the intermediate material is oxidized by the surrounding oxygen in the atmosphere during the heating treatment in an oxidizing atmosphere, it is presumed that the titanium hydride has the action of suppressing the progress of oxidation by means of the hydrogen that it possesses and stably forming the state of TiO before reaching $TiO_2$, which has small electrical conductivity.

Since no X-ray diffraction peak of the titanium hydride is detected after heating treatment, it is presumed that the hydrogen of the titanium hydride is finally diffused into the titanium base material or has reacted with oxygen to escape and diffuse to the outside, and consequently the hydrogen concentration of the outer layer portion is significantly reduced.

In order to obtain a significant effect of the present invention material by such a mechanism, it is necessary that, as shown in FIG. 2, a prescribed amount or more of the titanium hydride be present on the outer layer of the intermediate material (before the heating treatment in an oxidizing atmosphere).

In the present invention material obtained by subjecting the present invention intermediate material to heating treatment in an oxidizing atmosphere, a titanium oxide film is formed on the outermost surface as shown in FIG. 4 and FIG. 5. The thickness of the titanium oxide film is preferably 3 to 15 nm from the viewpoints of suppressing the initial contact resistance to a low level and ensuring durability to fluorine and applied voltage in the environment to which the present invention material is exposed.

If the thickness of the titanium oxide film is less than 3 nm, the contact resistance after the accelerated deterioration test in which fluorine is added or a voltage is applied will be more than 20 m$\Omega \cdot$cm$^2$ and the amount of increase in the contact resistance will be more than 10 m$\Omega \cdot$cm$^2$, and the durability will be insufficient. On the other hand, if the thickness of the titanium oxide film is more than 15 nm, the initial contact resistance is more than 10 m$\Omega \cdot$cm$^2$.

The thickness of the titanium oxide film of the outermost surface can be measured by observing a cross section immediately below the surface with a transmission electron microscope. As shown in FIG. 5, the portion 2 in a bright (whitish) film form is the titanium oxide film. On the other hand, in the case where a prescribed heating treatment is not performed, although the initial contact resistance is low, the contact resistance is increased to approximately 100 m$\Omega \cdot$cm$^2$ after the deterioration test.

In the conventional material, a carbide, a nitride, and/or a carbonitride of titanium present in a large amount in or immediately below the titanium oxide film is dissolved out in a corrosion environment in which fluorine is contained or in a usage environment in which an electric potential is applied, and is re-precipitated as an oxide that inhibits the contact electrical conductivity.

On the other hand, in the present invention material, it is preferable that cold rolling oil components containing C etc. which cause carbide formation be removed by pickling as pre-treatment after the cold rolling, or a carbide, a nitride, and/or a carbonitride of titanium produced on the surface by bright annealing be almost removed by performing pickling with nitrohydrofluoric acid or hydride formation treatment after the bright annealing.

As described above, the effect of the present invention has been exhibited when C is at 10 atomic % or less, N at 1 atomic % or less, and B at 1 atomic % or less as a result of an analysis of the surface using X-ray photoelectron spectroscopy (XPS) after the surface is subjected to sputtering of about 5 nm with argon.

Thus, a surface structure, in which a carbide, a nitride, and/or a carbonitride of titanium is hardly present, is formed on the surface of the present invention material; thereby, the durability in a corrosion environment in which fluorine is contained or in a usage environment in which an electric potential is applied is significantly improved.

Thus, in the present invention material, the amount of increase in the contact resistance after the deterioration test is 10 m$\Omega \cdot$cm$^2$ or less. It is preferably 4 m$\Omega \cdot$cm$^2$ or less. For reference, the contact resistance after the deterioration test is 20 m$\Omega \cdot$cm$^2$ or less, preferably 10 m$\Omega \cdot$cm$^2$ or less, and more preferably 8 m$\Omega \cdot$cm$^2$ or less.

Next, the method for producing the present invention material is described.

In producing a piece of foil serving as a titanium base material, in order to make it less likely for a carbide, a nitride, and a carbonitride of titanium to be produced on the surface, the component design described above is implemented, and the conditions of cold rolling, cleaning (including pickling), and annealing (atmosphere, temperature, time, etc.) are selected and these processes are performed. As necessary, subsequently to annealing, pickling cleaning is performed with a nitrohydrofluoric acid aqueous solution (e.g. 3.5 mass % hydrogen fluoride+4.5 mass % nitric acid).

After that, the titanium base material is subjected to any one of the treatments of (x) immersion in hydrochloric acid or sulfuric acid, which is a non-oxidizing acid, (y) cathodic electrolysis, and (z) heat treatment in a hydrogen-containing atmosphere; thus, a titanium hydride (TiH, TiH$_{1.5}$, or TiH$_2$) is formed on the outer layer of the titanium or the titanium alloy material.

If a large amount of the hydride is formed up to the interior of the titanium base material, the entire base material may be embrittled; thus, the method of (x) immersion in hydrochloric acid or sulfuric acid, which is a non-oxidizing acid, and the method of (y) cathodic electrolysis, in which methods hydrogen can be concentrated only relatively near the surface, are preferable.

Subsequently, the outer layer on which the titanium hydride is formed is subjected to heating treatment at 260° C. or more in an oxidizing atmosphere to form TiO as described above; thus, the surface structure of the present invention material is obtained. The air is most convenient as the oxidizing atmosphere. If the heating temperature is 350° C. or more, oxidation progresses rapidly, and the control for obtaining the present invention material is difficult; hence, the heating temperature is preferably less than 350° C. On the other hand, if the atmosphere of the heating treatment is a vacuum atmosphere, an inert gas atmosphere, or a reducing atmosphere, which is not an oxidizing atmosphere, a surface structure, in which TiO is distributed and the outermost surface is formed of a titanium oxide film, as in the present invention is not obtained, and the effect thereof is not exhibited either.

The heating treatment time needs to be designed so that the thickness of the titanium oxide film is controlled at the temperature of the heating treatment of not less than 260° C. and less than 350° C. While the suitable treatment time varies with the temperature and the atmosphere dew point of the heating treatment, the treatment time is preferably 1 to 15 minutes, more preferably 2 to 8 minutes, from the viewpoints of the degree of stability in the production and productivity.

The present invention material has excellent electrical conductivity and excellent durability as described above, and is very useful as a base material for a separator for a fuel cell.

The fuel cell separator using the present invention material as the base material effectively uses the surface of the present invention material as it is, as a matter of course. On the other hand, also a case where a noble metal-based metal such as gold, carbon, or a carbon-containing electrically conductive film is further formed on the surface of the present invention material may be possible, as a matter of course. However, in this case, in a fuel cell separator using the present invention material as the base material, even when there is a defect in the noble metal-based metal such as gold, the carbon film, or the carbon-containing film, the corrosion of the titanium base material is more suppressed than in conventional ones because the surface having excellent contact electrical conductivity and excellent corrosion resistance of the present invention material is present immediately below the film.

In the fuel cell separator using the present invention material as the base material, the surface has contact electrical conductivity and durability at the same level as those of the conventional carbon separator, and furthermore is less likely to crack; thus, the quality and lifetime of the fuel cell can be ensured over a long period of time.

EXAMPLES

Next, Examples of the present invention are described, but the conditions in Examples are only condition examples employed to assess the feasibility and effect of the present invention, and the present invention is not limited to these condition examples. The present invention may employ various conditions to the extent that they do not depart from the spirit of the present invention and they achieve the object of the present invention.

Example 1

To confirm that the target properties are obtained by the present invention intermediate material and the present invention material, test materials were prepared while various conditions of the titanium material or the titanium alloy material (hereinafter referred to as a "titanium base material"), the pre-treatment, the hydride formation treatment, and the heating treatment were changed.

A test piece of a prescribed size was taken from the test material, and the surface was investigated by X-ray diffraction and the contact resistance (contact electrical conductivity) after an accelerated deterioration test was measured.

The X-ray diffraction was performed using the conditions described above, and examples of the measurement results are as shown in FIG. 1 (the intermediate material before heating treatment) and FIG. 3 (after heating treatment).

The preparation conditions of the test material are shown below. The measurement results are shown in Tables 1 to 4 together with the various conditions.

[Titanium Base Material]

The titanium base material (material) is as follows.

M01: a titanium (JIS H 4600 type 1 TP270C); an industrial pure titanium, type 1

M02: a titanium (JIS H 4600 type 3 TP480C); an industrial pure titanium, type 2

M03: a titanium alloy (JIS H 4600 type 61); Al (2.5 to 3.5 mass %)—V (2 to 3 mass %)—Ti M04: a titanium alloy (JIS H 4600 type 16); Ta (4 to 6 mass %)—Ti M05: a titanium alloy (JIS H 4600 type 17); Pd (0.04 to 0.08 mass %)—Ti M06: a titanium alloy (JIS H 4600 type 19); Pd (0.04 to 0.08 mass %)—Co (0.2 to 0.8 mass %)—Ti M07: a titanium alloy (JIS H 4600 type 21); Ru (0.04 to 0.06 mass %)—Ni (0.4 to 0.6 mass %)—Ti M08: a titanium alloy; Pd (0.02 mass %)—Mm (0.002 mass %)—Ti Here, Mm is mixed rare-earth elements before isolation and purification (misch metal), and the composition of the Mm used is 55 mass % Ce, 31 mass % La, 10 mass % Nd, and 4 mass % Pr.

M09: a titanium alloy; Pd (0.03 mass %)—Y (0.002 mass %)—Ti

M10: a titanium alloy (JIS H 4600 type 11); Pd (0.12 to 0.25 mass %)—Ti

Note: M08 and M09, which are a titanium alloy other than those in JIS standards, refer to a base material obtained by performing smelting on a laboratory scale and performing hot rolling and cold rolling.

[Pre-Treatment]

The pre-treatment of the titanium base material is as follows.

P01: perform cold rolling up to a thickness of 0.1 mm, perform alkaline cleaning, then perform bright annealing at 800° C. for 20 seconds in an Ar atmosphere, and then clean the surface by pickling with nitrohydrofluoric acid P02: perform cold rolling up to a thickness of 0.1 mm, perform cleaning by pickling with nitrohydrofluoric acid to remove the rolling oil, and then perform bright annealing at 800° C. for 20 seconds in an Ar atmosphere P03: perform cold rolling up to a thickness of 0.1 mm, perform alkaline cleaning, and then perform bright annealing at 800° C. for 20 seconds in an Ar atmosphere In the surface cleaning with nitrohydrofluoric acid of P01 and P02, immersion was performed at 45° C. for 1 minute in an aqueous solution containing 3.5 mass % hydrogen fluoride (HF) and 4.5 mass % nitric acid ($HNO_3$). The portion extending approximately 5 μm in depth from the surface was dissolved.

[Hydride Formation Treatment]

(x) Pickling

H01: a 30 mass % hydrochloric acid aqueous solution

H02: a 30 mass % sulfuric acid aqueous solution (y) Cathodic electrolysis treatment H03: a sulfuric acid aqueous solution; pH 1; current density: 1 mA/$cm^2$ H04: an aqueous solution mainly based on sodium sulfate; pH 2; current density: 1 mA/$cm^2$ (z) Heat treatment in a hydrogen-containing atmosphere H05: an atmosphere (450° C.) of 20% hydrogen+80% Ar gas

[Heating Treatment]

K01: Heating treatment is performed in a heating furnace in the air atmosphere. The heating temperature was varied in the range of not less than 250° C. and less than 350° C., and the heating time was varied in the range of 1 to 8 minutes.

K02: Heating treatment is performed in an Ar atmosphere.

K03: Heating treatment is performed in a vacuum atmosphere ($5 \times 10^{-4}$ Torr).

[Deterioration Test]

Deterioration test 1 is performed by immersion for 4 days in a sulfuric acid solution at 80° C. adjusted to pH 3 and having a fluoride ion concentration of 20 ppm.

Deterioration test 2 is performed by application of an electric potential of 1.0 V (vs. SHE) for 24 hours in a sulfuric acid solution at 80° C. and pH 3.

Evaluative determination: In the amount of increase in the contact resistance, "A" refers to 4 mΩ$cm^2$ or less, "B" to more than 4 mΩ$cm^2$ and not more than 10 mΩ$cm^2$, and "C" to more than 10 mΩ$cm^2$. The value of the contact resistance measured using the conditions described above was 10 mΩ$cm^2$ or less in the case of "A", more than 10 and not more than 20 mΩ$cm^2$ in the case of "B", and more than 20 mΩ$cm^2$ in the case of "C".

The results when the conditions of the titanium base material and the pre-treatment were changed are shown in Table 1.

TABLE 1

| | | | Implementation No. | | | | | |
|---|---|---|---|---|---|---|---|---|
| | | Summary | 1-1 Comparative Example | 1-2 Comparative Example | 1-3 Comparative Example | 1-4 Present Invention Example | 1-5 Present Invention Example | 1-6 Present Invention Example |
| Material (Before heating treatment) Intermediate material | Preparation conditions | Base Material | M01 | M01 | M01 | M01 | M01 | M02 |
| | | Pre-treatment | P01 | P02 | P03 | P02 | P02 | P01 |
| | | Hydride formation treatment | — | — | — | H01 | H01 | H01 |
| | | Treatment temperature (° C.) | — | — | — | 70 | 70 | 70 |
| | | Treatment time (min) | — | — | — | 15 | 25 | 15 |
| | Titanium hydride of surface | $[I_{Ti-H}/I_{Ti} + I_{T-H}] \times 100$ (%) | 0 (-) | 0 (-) | 0 (-) | 64 | 76 | 62 |
| Heating treatment | Heating treatment conditions | Heating treatment | — | — | — | K01 | K01 | K01 |
| | | Treatment temperature (° C.) | — | — | — | 300 | 300 | 300 |
| | | Treatment time (min) | — | — | — | 5 | 5 | 5 |
| | Properties of surface | $[I_{TiO}/(I_{Ti} + I_{TiO})] \times 100$ (%) | 0 (-) | 0 (-) | 0 (-) | 5.0 | 5.8 | 5.0 |
| | | Thickness of titanium oxide coating film (nm) | 5 | 6 | 5 | 7 | 7 | 7 |
| | Contact electrical conductivity | Before accelerated deterioration test (mΩ · cm²) | 40 | 53 | 15 | 5 | 5 | 6 |
| | Accelerated deterioration test conditions 1 | After accelerated deterioration test (mΩ · cm²) | 1000 | 1000 | 1000 | 7 | 7 | 8 |
| | | Determination | C | C | C | A | A | A |
| | Contact electrical conductivity | Before accelerated deterioration test (mΩ · cm²) | 40 | 53 | 15 | 5 | 5 | 6 |
| | Accelerated deterioration test conditions 2 | After accelerated deterioration test (mΩ · cm²) | 1000 | 1000 | 1000 | 7 | 7 | 8 |
| | | Determination | C | C | C | A | A | A |

| | | | Implementation No. | | | | | |
|---|---|---|---|---|---|---|---|---|
| | | Summary | 1-7 Present Invention Example | 1-8 Present Invention Example | 1-9 Present Invention Example | 1-10 Present Invention Example | 1-11 Present Invention Example | 1-12 Present Invention Example |
| Material (Before heating treatment) Intermediate material | Preparation conditions | Base Material | M02 | M02 | M03 | M04 | M05 | M06 |
| | | Pre-treatment | P01 | P02 | P01 | P01 | P01 | P01 |
| | | Hydride formation treatment | H01 | H01 | H01 | H01 | H01 | H01 |
| | | Treatment temperature (° C.) | 70 | 70 | 70 | 70 | 70 | 70 |
| | | Treatment time (min) | 25 | 25 | 25 | 25 | 25 | 25 |
| | Titanium hydride of surface | $[I_{Ti-H}/I_{Ti} + I_{T-H}] \times 100$ (%) | 80 | 72 | 71 | 71 | 74 | 73 |
| Heating treatment | Heating treatment conditions | Heating treatment | K01 | K01 | K01 | K01 | K01 | K01 |
| | | Treatment temperature (° C.) | 300 | 300 | 300 | 300 | 300 | 300 |
| | | Treatment time (min) | 5 | 5 | 5 | 5 | 5 | 5 |
| | Properties of surface | $[I_{TiO}/(I_{Ti} + I_{TiO})] \times 100$ (%) | 6.1 | 5.3 | 5.3 | 5.2 | 5.7 | 5.5 |
| | | Thickness of titanium oxide coating film (nm) | 7 | 6 | 7 | 6 | 8 | 6 |
| | Contact electrical conductivity | Before accelerated deterioration test (mΩ · cm²) | 6 | 6 | 6 | 6 | 6 | 6 |
| | Accelerated deterioration test conditions 1 | After accelerated deterioration test (mΩ · cm²) | 8 | 8 | 8 | 8 | 7 | 8 |
| | | Determination | A | A | A | A | A | A |
| | Contact electrical conductivity | Before accelerated deterioration test (mΩ · cm²) | 6 | 6 | 6 | 6 | 6 | 6 |
| | Accelerated deterioration test conditions 2 | After accelerated deterioration test (mΩ · cm²) | 7 | 7 | 7 | 8 | 8 | 8 |
| | | Determination | A | A | A | A | A | A |

TABLE 1-continued

| | | | Implementation No. | | | | | |
|---|---|---|---|---|---|---|---|---|
| | | Summary | 1-13 Present Invention Example | 1-14 Present Invention Example | 1-15 Present Invention Example | 1-16 Present Invention Example | 1-17 Comparative Example | 1-18 Comparative Example |
| (Before heating treatment) Intermediate material | Material | Base Material | M07 | M08 | M09 | M10 | M04 | M05 |
| | Preparation conditions | Pre-treatment | P01 | P01 | P01 | P01 | P01 | P01 |
| | | Hydride formation treatment | H01 | H01 | H01 | H01 | H01 | H01 |
| | | Treatment temperature (° C.) | 70 | 70 | 70 | 70 | 70 | 70 |
| | | Treatment time (min) | 25 | 25 | 25 | 25 | 25 | 25 |
| | Titanium hydride of surface | $[I_{Ti-H}/I_{Ti} + I_{T-H}] \times 100\ (\%)$ | 75 | 73 | 74 | 74 | 75 | 74 |
| Heating treatment | Heating treatment conditions | Heating treatment | K01 | K01 | K01 | K01 | — | — |
| | | Treatment temperature (° C.) | 300 | 300 | 300 | 300 | — | — |
| | | Treatment time (min) | 5 | 5 | 5 | 5 | — | — |
| | Properties of surface | $[I_{TiO}/(I_{Ti} + I_{TiO})] \times 100\ (\%)$ | 5.2 | 5.3 | 5.5 | 5.4 | 0 (-) | 0 (-) |
| | | Thickness of titanium oxide coating film (nm) | 7 | 7 | 8 | 8 | 6 | 6 |
| | Contact electrical conductivity | Before accelerated deterioration test (mΩ·cm²) | 5 | 6 | 6 | 6 | 7 | 7 |
| | Accelerated deterioration test conditions 1 | After accelerated deterioration test (mΩ·cm²) | 7 | 8 | 8 | 8 | 108 | 109 |
| | | Determination | A | A | A | A | C | C |
| | Contact electrical conductivity | Before accelerated deterioration test (mΩ·cm²) | 5 | 6 | 6 | 6 | 7 | 7 |
| | Accelerated deterioration test conditions 2 | After accelerated deterioration test (mΩ·cm²) | 7 | 7 | 7 | 7 | 31 | 30 |
| | | Determination | A | A | A | A | C | C |

| | | | Implementation No. | | | | | |
|---|---|---|---|---|---|---|---|---|
| | | Summary | 1-19 Comparative Example | 1-20 Comparative Example | 1-21 Comparative Example | 1-22 Comparative Example | 1-23 Comparative Example | |
| (Before heating treatment) Intermediate material | Material | Base Material | M06 | M07 | M08 | M9 | M10 | |
| | Preparation conditions | Pre-treatment | P01 | P01 | P01 | P01 | P01 | |
| | | Hydride formation treatment | H01 | H01 | H01 | H01 | H01 | |
| | | Treatment temperature (° C.) | 70 | 70 | 70 | 70 | 70 | |
| | | Treatment time (min) | 25 | 25 | 25 | 25 | 25 | |
| | Titanium hydride of surface | $[I_{Ti-H}/I_{Ti} + I_{T-H}] \times 100\ (\%)$ | 73 | 75 | 73 | 74 | 74 | |
| Heating treatment | Heating treatment conditions | Heating treatment | — | — | — | — | — | |
| | | Treatment temperature (° C.) | — | — | — | — | — | |
| | | Treatment time (min) | — | — | — | — | — | |
| | Properties of surface | $[I_{TiO}/(I_{Ti} + I_{TiO})] \times 100\ (\%)$ | 0 (-) | 0 (-) | 0 (-) | 0 (-) | 0 (-) | |
| | | Thickness of titanium oxide coating film (nm) | 6 | 7 | 7 | 6 | 7 | |
| | Contact electrical conductivity | Before accelerated deterioration test (mΩ·cm²) | 6 | 7 | 6 | 7 | 6 | |
| | Accelerated deterioration test conditions 1 | After accelerated deterioration test (mΩ·cm²) | 106 | 110 | 104 | 102 | 101 | |
| | | Determination | C | C | C | C | C | |
| | Contact electrical conductivity | Before accelerated deterioration test (mΩ·cm²) | 6 | 7 | 6 | 7 | 6 | |
| | Accelerated deterioration test conditions 2 | After accelerated deterioration test (mΩ·cm²) | 31 | 33 | 31 | 30 | 27 | |
| | | Determination | C | C | C | C | C | |

The results when the treatment method, the treatment time, and the treatment temperature were varied in the hydride formation treatment are shown in Table 2.

TABLE 2

| | | | Implementation No. | | | | | |
|---|---|---|---|---|---|---|---|---|
| | | | 2-1 | 2-2 | 2-3 | 2-4 | 2-5 | 2-6 |
| | | | Summary | | | | | |
| | Material | Base material | Comparative Example M01 | Comparative Example M01 | Comparative Example M01 | Comparative Example M01 | Present Invention Example M01 | Present Invention Example M01 |
| (Before heating treatment) Intermediate material | Preparation conditions | Pre-treatment | P03 | P01 | P01 | P01 | P01 | P01 |
| | | Hydride formation treatment | — | H01 | H01 | H01 | H01 | H01 |
| | | Treatment temperature (° C.) | — | 70 | 70 | 70 | 70 | 70 |
| | | Treatment time (min) | — | 0.5 | 5 | 10 | 15 | 20 |
| | Titanium hydride of surface | $[I_{Ti-H}/(I_{Ti} + I_{T-H})] \times 100$ (%) | 0 (−) | 0 (−) | 25 (−) | 51 (−) | 55 | 63 |
| Heating treatment | Heating treatment conditions | Heating treatment | K01 | K01 | K01 | K01 | K01 | K01 |
| | | Treatment temperature (° C.) | 300 | 300 | 300 | 300 | 300 | 300 |
| | | Treatment time (min) | 5 | 5 | 5 | 5 | 5 | 5 |
| | Properties of surface | $[I_{TiO}/(I_{Ti} + I_{TiO})] \times 100$ (%) | 0 (−) | 0 (−) | 0 (−) | 3.9 | 4.5 | 4.8 |
| | | Thickness of titanium oxide coating film (nm) | 6 | 6 | 7 | 7 | 7 | 7 |
| | Contact electrical conductivity | Before accelerated deterioration test (mΩ·cm²) | 73 | 205 | 65 | 6 | 6 | 6 |
| | Accelerated deterioration test conditions 1 | After accelerated deterioration test (mΩ·cm²) | 1000 | 504 | 112 | 42 | 9 | 7 |
| | | Determination | C | C | C | C | A | A |
| | Contact electrical conductivity | Before accelerated deterioration test (mΩ·cm²) | 73 | 205 | 65 | 6 | 6 | 6 |
| | Accelerated deterioration test conditions 2 | After accelerated deterioration test (mΩ·cm²) | 1000 | 780 | 136 | 22 | 8 | 7 |
| | | Determination | C | C | C | C | A | A |

| | | | Implementation No. | | | | | |
|---|---|---|---|---|---|---|---|---|
| | | | 2-7 | 2-8 | 2-9 | 2-10 | 2-11 | 2-12 |
| | | | Summary | | | | | |
| | Material | Base material | Present Invention Example M01 | Present Invention Example M01 | Present Invention Example M01 | Present Invention Example M01 | Present Invention Example M01 | Present Invention Example M01 |
| (Before heating treatment) Intermediate material | Preparation conditions | Pre-treatment | P01 | P01 | P01 | P01 | P01 | P01 |
| | | Hydride formation treatment | H01 | H01 | H01 | H02 | H01 | H03 |
| | | Treatment temperature (° C.) | 70 | 70 | 50 | 50 | 70 | 50 |
| | | Treatment time (min) | 25 | 30 | 30 | 30 | 15 | 360 |
| | Titanium hydride of surface | $[I_{Ti-H}/(I_{Ti} + I_{T-H})] \times 100$ (%) | 79 | 85 | 56 | 65 | 61 | 75 |
| Heating treatment | Heating treatment conditions | Heating treatment | K01 | K01 | K01 | K01 | K01 | K01 |
| | | Treatment temperature (° C.) | 300 | 300 | 300 | 300 | 300 | 300 |
| | | Treatment time (mm) | 5 | 5 | 5 | 5 | 5 | 5 |
| | Properties of surface | $[I_{TiO}/(I_{Ti} + I_{TiO})] \times 100$ (%) | 6.0 | 6.6 | 4.2 | 5.0 | 4.5 | 5.8 |
| | | Thickness of titanium oxide coating film (nm) | 6 | 6 | 6 | 7 | 7 | 6 |
| | Contact electrical conductivity | Before accelerated deterioration test (mΩ·cm²) | 5 | 6 | 7 | 6 | 6 | 6 |
| | Accelerated deterioration test conditions 1 | After accelerated deterioration test (mΩ·cm²) | 6 | 7 | 9 | 7 | 8 | 7 |
| | | Determination | A | A | A | A | A | A |
| | Contact electrical conductivity | Before accelerated deterioration test (mΩ·cm²) | 5 | 6 | 7 | 6 | 6 | 6 |
| | Accelerated deterioration test conditions 2 | After accelerated deterioration test (mΩ·cm²) | 6 | 7 | 9 | 8 | 7 | 7 |
| | | Determination | A | A | A | A | A | A |

TABLE 2-continued

|  |  |  | Implementation No. | | |
| --- | --- | --- | --- | --- | --- |
|  |  |  | 2-13 | 2-14 | 2-15 |
|  |  |  | | Summary | |
|  | Material | Base material | Present Invention Example M01 | Present Invention Example M01 | Present Invention Example M01 |
| (Before heating treatment) Intermediate material | Preparation conditions | Pre-treatment | P01 | P01 | P01 |
|  |  | Hydride formation treatment | H04 | H04 | H05 |
|  |  | Treatment temperature (° C.) | 50 | 50 | 400 |
|  |  | Treatment time (mm) | 10 | 30 | 60 |
|  | Titanium hydride of surface | $[I_{Ti-H}/(I_{Ti} + I_{T-H})] \times 100$ (%) | 66 | 76 | 62 |
| Heating treatment | Heating treatment conditons | Heating treatment | K01 | K01 | K01 |
|  |  | Treatment temperature (° C.) | 300 | 300 | 300 |
|  |  | Treatment time (min) | 5 | 5 | 5 |
|  | Properties of surface | $[I_{TiO}/(I_{Ti} + I_{TiO})] \times 100$ (%) | 5.0 | 5.9 | 4.6 |
|  |  | Thickness of titanium oxide coating film (nm) | 7 | 6 | 7 |
|  | Contact electrical conductivity | Before accelerated deterioration test (mΩ · cm$^2$) | 6 | 6 | 6 |
|  | Accelerated deterioration test conditions 1 | After accelerated deterioration test (mΩ · cm$^2$) | 8 | 7 | 8 |
|  |  | Determination | A | A | A |
|  | Contact electrical conductivity | Before accelerated deterioration test (mΩ · cm$^2$) | 6 | 6 | 6 |
|  | Acclerated deterioration test conditions 2 | After accelerated deterioration test (mΩ · cm$^2$) | 8 | 7 | 8 |
|  |  | Determination | A | A | A |

The results when the atmosphere, the treatment time, and the treatment temperature were varied in the heating treatment are shown in Table 3.

TABLE 3

|  |  |  | Implementation No. | | | | | |
| --- | --- | --- | --- | --- | --- | --- | --- | --- |
|  |  |  | 3-1 | 3-2 | 3-3 | 3-4 | 3-5 | 3-6 |
|  |  | Summary | Comparative Example | Comparative Example | Present Invention Example | Present Invention Example | Present Invention Example | Present Invention Example |
| (Before heating treatment) Intermediate material | Material | Base Material | M01 | M01 | M01 | M01 | M01 | M01 |
|  | Preparation conditions | Pre-treatment | P01 | P01 | P01 | P01 | P01 | P01 |
|  |  | Hydride formation treatment | H01 | H01 | H01 | H01 | H01 | H01 |
|  |  | Treatment temperature (° C.) | 70 | 70 | 70 | 70 | 70 | 70 |
|  |  | Treatment time (min) | 25 | 15 | 15 | 25 | 25 | 25 |
|  | Titanium hydride of surface | $[I_{Ti-H}/(I_{Ti} + I_{T-H})] \times 100$ (%) | 77 | 55 | 55 | 78 | 79 | 76 |
| Heating treatment | Heating treatment conditions | Heating treatment | — | K01 | K01 | K01 | K01 | K01 |
|  |  | Treatment temperature (° C.) | — | 250 | 260 | 275 | 300 | 300 |
|  |  | Treatment time (min) | — | 5 | 5 | 5 | 1 | 2.5 |
|  | Properties of surface | $[I_{TiO}/(I_{Ti} + I_{TiO})] \times 100$ (%) | 0 (-) | 0.2 (-) | 0.6 | 1.3 | 2.1 | 3.8 |
|  |  | Thickness of titanium oxide coating film (nm) | 5 | 5 | 7 | 7 | 7 | 6 |
|  | Contact electrical conductivity | Before accelerated deterioration test (mΩ · cm$^2$) | 8 | 7 | 8 | 8 | 7 | 6 |
|  | Accelerated deterioration test conditions 1 | After accelerated deterioration test (mΩ · cm$^2$) | 121 | 90 | 14 | 10 | 8 | 7 |
|  |  | Determination | C | C | B | A | A | A |
|  | Contact electrical conductivity | Before accelerated deterioration test (mΩ · cm$^2$) | 8 | 7 | 8 | 8 | 7 | 6 |

TABLE 3-continued

|  |  |  |  |  |  |  |  |  |
|---|---|---|---|---|---|---|---|---|
|  | Accelerated deterioration test conditions 2 | After accelerated deterioration test (mΩ · cm$^2$) | 33 | 30 | 13 | 9 | 8 | 8 |
|  |  | Determination | C | C | B | A | A | A |

|  |  |  | Implementation No. | | | | | |
|---|---|---|---|---|---|---|---|---|
|  |  | Summary | 3-7 Present Invention Example | 3-8 Present Invention Example | 3-9 Present Invention Example | 3-10 Comparative Example | 3-11 Comparative Example | 3-12 Comparative Example |
| Material (Before heating treatment) Intermediate material | Preparation conditions | Base Material | M01 | M01 | M01 | M01 | M01 | M01 |
|  |  | Pre-treatment | P01 | P01 | P01 | P01 | P01 | P01 |
|  |  | Hydride formation treatment | H01 | H01 | H01 | H01 | H01 | H01 |
|  |  | Treatment temperature (° C.) | 70 | 70 | 70 | 70 | 70 | 70 |
|  |  | Treatment time (min) | 25 | 25 | 25 | 25 | 25 | 25 |
|  | Titanium hydride of surface | $[I_{Ti-H}/I_{Ti} + I_{T-H})] \times 100$ (%) | 79 | 78 | 78 | 80 | 79 | 77 |
| Heating treatment | Heating treatment conditions | Heating treatment | K01 | K01 | K01 | K02 | K03 | K03 |
|  |  | Treatment temperature (° C.) | 300 | 300 | 340 | 300 | 300 | 500 |
|  |  | Treatment time (min) | 5 | 7.5 | 8 | 5 | 5 | 10 |
|  | Properties of surface | $[I_{TiO}/(I_{Ti} + I_{TiO})] \times 100$ (%) | 6.0 | 5.9 | 3.7 | 0 (-) | 0 (-) | 0 (-) |
|  |  | Thickness of titanium oxide coating film (nm) | 6 | 7 | 12 | 6 | 5 | 6 |
|  | Contact electrical conductivity | Before accelerated deterioration test (mΩ · cm$^2$) | 5 | 5 | 8 | 7 | 8 | 8 |
|  | Accelerated deterioration test conditions 1 | After accelerated deterioration test (mΩ · cm$^2$) | 6 | 7 | 9 | 120 | 122 | 120 |
|  |  | Determination | A | A | A | C | C | C |
|  | Contact electrical conductivity | Before accelerated deterioration test (mΩ · cm$^2$) | 5 | 5 | 8 | 7 | 8 | 8 |
|  | Accelerated deterioration test conditions 2 | After accelerated deterioration test (mΩ · cm$^2$) | 6 | 7 | 10 | 32 | 33 | 33 |
|  |  | Determination | A | A | A | C | C | C |

|  |  |  | Implementation No. | | | | | |
|---|---|---|---|---|---|---|---|---|
|  |  | Summary | 3-13 Comparative Example | 3-14 Comparative Example | 3-15 Comparative Example | 3-16 Comparative Example | 3-17 Comparative Example | |
| Material (Before heating treatment) Intermediate material | Preparation conditions | Base Material | M05 | M06 | M07 | M08 | M09 | |
|  |  | Pre-treatment | P01 | P01 | P01 | P01 | P01 | |
|  |  | Hydride formation treatment | H01 | H01 | H01 | H01 | H01 | |
|  |  | Treatment temperature (° C.) | 70 | 70 | 70 | 70 | 70 | |
|  |  | Treatment time (min) | 25 | 25 | 25 | 25 | 25 | |
|  | Titanium hydride of surface | $[I_{Ti-H}/I_{Ti} + I_{T-H})] \times 100$ (%) | 74 | 73 | 75 | 73 | 74 | |
| Heating treatment | Heating treatment conditions | Heating treatment | K02 | K02 | K02 | K02 | K02 | |
|  |  | Treatment temperature (° C.) | 500 | 500 | 500 | 500 | 300 | |
|  |  | Treatment time (min) | 10 | 10 | 10 | 10 | 5 | |
|  | Properties of surface | $[I_{TiO}/(I_{Ti} + I_{TiO})] \times 100$ (%) | 0 (-) | 0 (-) | 0 (-) | 0 (-) | 0 (-) | |
|  |  | Thickness of titanium oxide coating film (nm) | 8 | 9 | 7 | 8 | 9 | |
|  | Contact electrical conductivity | Before accelerated deterioration test (mΩ · cm$^2$) | 8 | 8 | 7 | 8 | 8 | |
|  | Accelerated deterioration test conditions 1 | After accelerated deterioration test (mΩ · cm$^2$) | 105 | 103 | 104 | 101 | 103 | |
|  |  | Determination | C | C | C | C | C | |
|  | Contact electrical conductivity | Before accelerated deterioration test (mΩ · cm$^2$) | 8 | 8 | 7 | 8 | 8 | |

TABLE 3-continued

| | | | | | | | |
|---|---|---|---|---|---|---|---|
| | Accelerated deterioration test conditions 2 | After accelerated deterioration test (mΩ · cm$^2$) | 31 | 30 | 32 | 33 | 31 |
| | | Determination | C | C | C | C | C |

| | | | Implementation No. | | |
|---|---|---|---|---|---|
| | | | 3-18 Comparative Example | 3-19 Comparative Example | 3-20 Comparative Example |
| | Summary | | | | |
| Material (Before heating treatment) Intermediate material | Material | Base Material | M09 | M10 | M10 |
| | Preparation conditions | Pre-treatment | P01 | P01 | P01 |
| | | Hydride formation treatment | H01 | H01 | H01 |
| | | Treatment temperature (° C.) | 70 | 70 | 70 |
| | | Treatment time (min) | 25 | 25 | 25 |
| | Titanium hydride of surface | $[I_{Ti-H}/I_{Ti} + I_{T-H})] \times 100$ (%) | 74 | 74 | 74 |
| Heating treatment | Heating treatment conditions | Heating treatment | K02 | K02 | K02 |
| | | Treatment temperature (° C.) | 500 | 300 | 500 |
| | | Treatment time (min) | 10 | 10 | 10 |
| | Properties of surface | $[I_{TiO}/(I_{Ti} + I_{TiO})] \times 100$ (%) | 0 (-) | 0 (-) | 0 (-) |
| | | Thickness of titanium oxide coating film (nm) | 8 | 9 | 8 |
| | Contact electrical conductivity | Before accelerated deterioration test (mΩ · cm$^2$) | 8 | 8 | 9 |
| | Accelerated deterioration test conditions 1 | After accelerated deterioration test (mΩ · cm$^2$) | 109 | 101 | 102 |
| | | Determination | C | C | C |
| | Contact electrical conductivity | Before accelerated deterioration test (mΩ · cm$^2$) | 8 | 8 | 9 |
| | Accelerated deterioration test conditions 2 | After accelerated deterioration test (mΩ · cm$^2$) | 31 | 30 | 31 |
| | | Determination | C | C | C |

The results when various conditions were changed are shown in Table 4.

TABLE 4

| | | | Implementation No. | | | | |
|---|---|---|---|---|---|---|---|
| | | | 4-1 Present Invention Example | 4-2 Present Invention Example | 4-3 Present Invention Example | 4-4 Present Invention Example | 4-5 Present Invention Example |
| | Summary | | | | | | |
| Material (Before heating treatment) Intermediate material | Material | Base Material | M01 | M01 | M01 | M02 | M03 |
| | Preparation conditions | Pre-treatment | P02 | P02 | P02 | P02 | P01 |
| | | Hydride formation treatment | H01 | H01 | H04 | H04 | H04 |
| | | Treatment temperature (° C.) | 70 | 70 | 50 | 50 | 50 |
| | | Treatment time (min) | 25 | 25 | 10 | 10 | 10 |
| | Titanium hydride of surface | $[I_{Ti-H}/I_{Ti} + I_{T-H})] \times 100$ (%) | 79 | 78 | 68 | 67 | 69 |
| Heating treatment | Heating treatment conditions | Heating treatment | K01 | K01 | K01 | K01 | K01 |
| | | Treatment temperature (° C.) | 300 | 350 | 350 | 350 | 350 |
| | | Treatment time (min) | 2.5 | 5 | 5 | 5 | 5 |
| | Properties of surface | $[I_{TiO}/(I_{Ti} + I_{TiO})] \times 100$ (%) | 3.5 | 6.4 | 5.1 | 5.2 | 5.4 |
| | | Thickness of titanium oxide coating film (nm) | 7 | 7 | 7 | 6 | 7 |
| | Contact electrical conductivity | Before accelerated deterioration test (mΩ · cm$^2$) | 6 | 5 | 6 | 7 | 6 |

TABLE 4-continued

| | | | | | | | |
|---|---|---|---|---|---|---|---|
| | Accelerated deterioration test conditions 1 | After accelerated deterioration test (mΩ·cm²) | 7 | 6 | 7 | 7 | 7 |
| | | Determination | A | A | A | A | A |
| | Contact electrical conductivity | Before accelerated deterioration test (mΩ·cm²) | 6 | 5 | 6 | 7 | 6 |
| | Accelerated deterioration test conditions 2 | After accelerated deterioration test (mΩ·cm²) | 7 | 6 | 7 | 8 | 8 |
| | | Determination | A | A | A | A | A |

| | | | Implementation No. | | | | |
|---|---|---|---|---|---|---|---|
| | | | 4-6 Present Invention Example | 4-7 Present Invention Example | 4-8 Present Invention Example | 4-9 Present Invention Example | 4-10 Present Invention Example |
| | | Summary | | | | | |
| (Before heating treatment) Intermediate material | Material | Base Material | M04 | M04 | M05 | M06 | M07 |
| | Preparation conditions | Pre-treatment | P01 | P01 | P01 | P01 | P01 |
| | | Hydride formation treatment | H04 | H05 | H04 | H04 | H04 |
| | | Treatment temperature (°C.) | 50 | 400 | 50 | 50 | 50 |
| | | Treatment time (min) | 10 | 60 | 10 | 10 | 10 |
| | Titanium hydride of surface | $[I_{Ti-H}/I_{Ti} + I_{T-H})] \times 100$ (%) | 65 | 65 | 67 | 69 | 65 |
| Heating treatment | Heating treatment conditions | Heating treatment | K01 | K01 | K01 | K01 | K01 |
| | | Treatment temperature (°C.) | 350 | 350 | 300 | 300 | 300 |
| | | Treatment time (min) | 5 | 5 | 5 | 5 | 5 |
| | Properties of surface | $[I_{TiO}/(I_{Ti} + I_{TiO})] \times 100$ (%) | 4.7 | 4.5 | 5.2 | 5.4 | 5.1 |
| | | Thickness of titanium oxide coating film (nm) | 7 | 7 | 7 | 6 | 7 |
| | Contact electrical conductivity | Before accelerated deterioration test (mΩ·cm²) | 6 | 6 | 6 | 6 | 7 |
| | Accelerated deterioration test conditions 1 | After accelerated deterioration test (mΩ·cm²) | 8 | 8 | 7 | 7 | 7 |
| | | Determination | A | A | A | A | A |
| | Contact electrical conductivity | Before accelerated deterioration test (mΩ·cm²) | 6 | 6 | 6 | 6 | 7 |
| | Accelerated deterioration test conditions 2 | After accelerated deterioration test (mΩ·cm²) | 7 | 7 | 7 | 7 | 8 |
| | | Determination | A | A | A | A | A |

| | | | Implementation No. | | | | |
|---|---|---|---|---|---|---|---|
| | | | 4-11 Present Invention Example | 4-12 Present Invention Example | 2-13 Present Invention Example | 2-14 Present Invention Example | |
| | | Summary | | | | | |
| (Before heating treatment) Intermediate material | Material | Base Material | M08 | M09 | M01 | M01 | |
| | Preparation conditions | Pre-treatment | P01 | P01 | P01 | P01 | |
| | | Hydride formation treatment | H04 | H04 | H04 | H04 | |
| | | Treatment temperature (°C.) | 50 | 50 | 50 | 50 | |
| | | Treatment time (min) | 10 | 10 | 10 | 30 | |
| | Titanium hydride of surface | $[I_{Ti-H}/I_{Ti} + I_{T-H})] \times 100$ (%) | 66 | 68 | 66 | 76 | |
| Heating treatment | Heating treatment conditions | Heating treatment | K01 | K01 | K01 | K01 | |
| | | Treatment temperature (°C.) | 300 | 300 | 300 | 300 | |
| | | Treatment time (min) | 5 | 5 | 5 | 5 | |
| | Properties of surface | $[I_{TiO}/(I_{Ti} + I_{TiO})] \times 100$ (%) | 5.8 | 5.6 | 5.0 | 5.9 | |
| | | Thickness of titanium oxide coating film (nm) | 7 | 7 | 7 | 6 | |
| | Contact electrical conductivity | Before accelerated deterioration test (mΩ·cm²) | 7 | 7 | 6 | 6 | |

TABLE 4-continued

| | | | | | |
|---|---|---|---|---|---|
| Accelerated deterioration test conditions 1 | After accelerated deterioration test (mΩ·cm²) | 8 | 8 | 8 | 7 |
| | Determination | A | A | A | A |
| Contact electrical conductivity | Before accelerated deterioration test (mΩ·cm²) | 7 | 7 | 6 | 6 |
| Accelerated deterioration test conditions 2 | After accelerated deterioration test (mΩ·cm²) | 8 | 8 | 8 | 7 |
| | Determination | A | A | A | A |

From Tables 1 to 4, it is found that the contact electrical conductivity of the present invention examples using the present invention intermediate material, in which the composition ratio of the titanium hydride ($I_{Ti-H}/(I_{Ti}+I_{T-H})$) at the surface is 55% or more, is much better than the contact electrical conductivity of the comparative examples (conventional materials). The effect of the present invention has been exhibited regardless of whether a platinum group-based element is contained or not. On the other hand, in the comparative example of the case where the heating treatment in an oxidizing atmosphere is not performed or the case where the atmosphere of the heating treatment is a vacuum atmosphere or an inert gas atmosphere, which is not an oxidizing atmosphere, a surface structure in which TiO is distributed as in the present invention example is not obtained, and the effect thereof is not exhibited either.

INDUSTRIAL APPLICABILITY

As described above, according to the present invention, it becomes possible to provide a titanium material or a titanium alloy material for a fuel cell separator having excellent contact-to-carbon electrical conductivity and excellent durability and a fuel cell separator having excellent contact-to-carbon electrical conductivity and excellent durability. When the fuel cell separator is used, the lifetime of the fuel cell can be greatly prolonged. Thus, the present invention has high applicability in battery manufacturing industries.

REFERENCE SIGNS LIST

1 Ti (titanium material or titanium alloy material)
2 portion in a bright (whitish) film form (titanium oxide film)

The invention claimed is:

1. A titanium material or a titanium alloy material, comprising:
    a titanium or titanium alloy; and
    a titanium oxide film on a surface of the titanium or titanium alloy, wherein an outermost surface of the titanium oxide film comprises $TiO_2$,
    wherein a composition ratio of TiO ($I_{TiO}/(I_{Ti}+I_{TiO}))\times100$ based on a maximum intensity of X-ray diffraction peaks of TiO ($I_{TiO}$) and a maximum intensity of X-ray diffraction peaks of metal titanium ($I_{Ti}$) in X-ray diffraction measured at an incident angle to a surface of 0.3° is 0.5% or more, and
    wherein each of amounts of increase in contact resistance from before to after deterioration test 1 and deterioration test 2 below is 10 mΩcm² or less:
    deterioration test 1: immersion for 4 days in a sulfuric acid aqueous solution at 80° C. adjusted to pH 3 and having a fluoride ion concentration of 20 ppm,
    deterioration test 2: application of an electric potential of 1.0 V (vs. SHE) for 24 hours in a sulfuric acid solution at 80° C. and pH 3.

2. The titanium material or the titanium alloy material according to claim 1, wherein a diffraction peak of TiO is detected in X-ray diffraction measured at the surface at an incident angle of 0.3° and the maximum intensity of the X-ray diffraction peaks of a titanium hydride is at a background level.

3. The titanium material or the titanium alloy material according to claim 1, wherein a thickness of the oxide film is 3 to 15 nm.

4. A method for producing a titanium material or a titanium alloy material, comprising:
    providing a titanium intermediate material or a titanium alloy intermediate material,
    forming a titanium hydride layer on an outer layer of the titanium intermediate material or titanium alloy intermediate material, wherein a composition ratio of the titanium hydride ($I_{Ti-H}/(I_{Ti}+I_{T-H})$) at a surface, based on a maximum intensity of metal titanium ($I_{Ti}$) and a maximum intensity of the titanium hydride ($I_{Ti-H}$) in X-ray diffraction peaks measured at an incident angle to a surface of 0.3° is 55% or more, and
    subjecting the titanium intermediate material or titanium alloy intermediate material, having the titanium hydride layer on an outer layer thereof, to a heating treatment at a temperature of not less than 260° C. and less than 350° C. in an oxidizing atmosphere to form an oxide film.

5. A fuel cell separator comprising a titanium material or a titanium alloy material, wherein:
    the titanium material or titanium alloy material comprises a titanium or titanium alloy, and a titanium oxide film on a surface of the titanium or titanium alloy; and
    a composition ratio of TiO ($I_{TiO}/I_{Ti}+I_{TiO}))\times100$ based on a maximum intensity of X-ray diffraction peaks of TiO ($I_{TiO}$), and a maximum intensity of X-ray diffraction peaks of metal titanium ($I_{Ti}$) in X-ray diffraction measured at an incident angle to a surface of 0.3° is 0.5% or more.

6. A polymer electrolyte fuel cell comprising the fuel cell separator according to claim 5.

* * * * *